United States Patent
Takahashi et al.

(10) Patent No.: US 11,148,665 B2
(45) Date of Patent: Oct. 19, 2021

(54) VEHICULAR MOTION CONTROL DEVICE AND METHOD

(71) Applicant: HITACHI AUTOMOTIVE SYSTEMS, LTD., Ibaraki (JP)

(72) Inventors: Junya Takahashi, Tokyo (JP); Atsushi Yokoyama, Tokyo (JP); Masamichi Imamura, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 188 days.

(21) Appl. No.: 15/765,443

(22) PCT Filed: Oct. 11, 2016

(86) PCT No.: PCT/JP2016/080068
§ 371 (c)(1),
(2) Date: Apr. 2, 2018

(87) PCT Pub. No.: WO2017/073308
PCT Pub. Date: May 4, 2017

(65) Prior Publication Data
US 2018/0297594 A1   Oct. 18, 2018

(30) Foreign Application Priority Data
Oct. 30, 2015  (JP) .............................. JP2015-214082

(51) Int. Cl.
*B60W 30/10*  (2006.01)
*B60T 7/12*   (2006.01)
(Continued)

(52) U.S. Cl.
CPC ............. *B60W 30/10* (2013.01); *B60L 15/20* (2013.01); *B60T 7/12* (2013.01); *B60T 8/17* (2013.01);
(Continued)

(58) Field of Classification Search
None
See application file for complete search history.

(56) References Cited

U.S. PATENT DOCUMENTS 8,078,381 B2 * 12/2011 Yamakado ......... B60K 31/0066
180/179
2004/0236490 A1   11/2004 Kin
(Continued)

FOREIGN PATENT DOCUMENTS

CN   1792686 A   6/2006
CN   1796204 A   7/2006
(Continued)

OTHER PUBLICATIONS

Extended European Search Report dated Jun. 17, 2019 for the European Patent Application No. 16859545.2.
(Continued)

*Primary Examiner* — Yuen Wong
*Assistant Examiner* — Hongye Liang
(74) *Attorney, Agent, or Firm* — Volpe Koenig

(57) ABSTRACT

Provided are a vehicular motion control device and method such that, even when a vehicle is turning, the target trajectory can be followed while maintaining traveling stability, with a reduced sense of incongruity felt by the driver. This vehicular motion control device is equipped with: a target trajectory acquisition unit that acquires a target trajectory for a vehicle to travel; and a speed control unit that increases or decreases the longitudinal acceleration generated in the vehicle, the longitudinal acceleration being positive in the vehicle travel direction. If the vehicle deviates from the target trajectory during turning, the speed control unit performs longitudinal acceleration control to increase or decrease the longitudinal acceleration.

12 Claims, 17 Drawing Sheets

(51) Int. Cl.

*B60T 8/1755* (2006.01)
  *B60W 30/045* (2012.01)
  *B60T 8/17* (2006.01)
  *B62D 6/00* (2006.01)
  *B60L 15/20* (2006.01)
  *B60W 10/04* (2006.01)
  *B60W 10/20* (2006.01)
  *B60W 30/02* (2012.01)
  *G05D 1/02* (2020.01)
  *G05D 1/08* (2006.01)
  *B62D 15/02* (2006.01)

(52) U.S. Cl.
  CPC ........... *B60T 8/1755* (2013.01); *B60W 10/04* (2013.01); *B60W 10/20* (2013.01); *B60W 30/025* (2013.01); *B60W 30/045* (2013.01); *B62D 6/00* (2013.01); *B62D 6/008* (2013.01); *G05D 1/0223* (2013.01); *G05D 1/0246* (2013.01); *G05D 1/0278* (2013.01); *G05D 1/0891* (2013.01); *B60W 2420/42* (2013.01); *B60W 2510/18* (2013.01); *B60W 2510/20* (2013.01); *B60W 2520/10* (2013.01); *B60W 2520/14* (2013.01); *B60W 2556/50* (2020.02); *B60W 2556/60* (2020.02); *B60W 2710/207* (2013.01); *B60W 2720/10* (2013.01); *B60W 2720/14* (2013.01); *B62D 15/025* (2013.01); *G05D 2201/0213* (2013.01); *Y02T 10/72* (2013.01)

(56) References Cited

U.S. PATENT DOCUMENTS

| | | | |
|---|---|---|---|
| 2006/0149448 | A1 | 7/2006 | Tange et al. |
| 2008/0294321 | A1 | 11/2008 | Yamakado et al. |
| 2009/0037064 | A1* | 2/2009 | Nakamura ............ B60T 8/1755 701/70 |
| 2010/0145576 | A1 | 6/2010 | Doi |
| 2012/0221168 | A1 | 8/2012 | Zeng et al. |
| 2013/0131925 | A1 | 5/2013 | Isaji et al. |
| 2013/0131947 | A1* | 5/2013 | Takahashi ............ B60T 7/042 701/70 |

FOREIGN PATENT DOCUMENTS

| | | | |
|---|---|---|---|
| CN | 101318509 | A | 12/2008 |
| JP | 03-125061 | A | 5/1991 |
| JP | 2004-284485 | A | 10/2004 |
| JP | 2005-289205 | A | 10/2005 |
| JP | 2005289205 | * | 10/2005 |
| JP | 2006-213311 | A | 8/2006 |
| JP | 2010-126077 | A | 6/2010 |
| JP | 2013-126854 | A | 6/2013 |
| JP | 2015-074425 | A | 4/2015 |

OTHER PUBLICATIONS

International Search Report for WO 2017/073308 A1, dated Jan. 10, 2017.
Chinese Office Action dated May 19, 2020 for the Chinese Patent Application No. 201680053181.1.
Chinese Office Action dated Jul. 21, 2021 for Chinese Patent Application No. 201680053181.1.

* cited by examiner (A) WHEN VEHICLE POSITION IS OUTSIDE TURNING OF TARGET TRAJECTORY (B) WHEN VEHICLE POSITION IS INSIDE TURNING OF TARGET TRAJECTORY

VEHICULAR MOTION CONTROL DEVICE AND METHOD

TECHNICAL FIELD

The present invention relates to a vehicular motion control device and method, and more particularly, to a vehicular motion control device and method for accelerating and decelerating a vehicle so that a motion state of the vehicle is suitable.

BACKGROUND ART

Conventionally, a yaw moment control technique of setting a target trajectory from camera information, a global positioning system (GPS), map information, or the like, and generating a yaw moment in a vehicle by a steering angle or a difference in a braking or driving force between left and right tires of the vehicle so as to follow the target trajectory has been known (for example, PTL 1 and 2).

With such a control technique, it is possible to prevent the vehicle from significantly deviating from the target trajectory to deviate from a lane, such that it can be expected to decrease a driving load of a driver. In addition, when a control range of a vehicular motion is extended up to automatic driving, such a technology is indispensable.

However, in the trajectory following assist by a yaw moment control using the steering angle, since the steering angle is directly changed by a steering angle control, the steering angle change may cause the driver to feel a sense of incongruity. For this reason, it is difficult to implement a control so as to improve trajectory followability in a region in which deviation from the target trajectory is small, and it is necessary to limit a control intervention scene to a case in which the vehicle deviates from the lane.

Here, as a method for preventing the steering angle change due to the steering angle control from being transferred to the driver, for example, a system such as steer-by-wire is known (for example, PTL 3).

In the steer-by-wire system, the steering angle and an actual tire steering angle are separated from each other, such that the actual tire steering angle can be controlled independently of the steering angle. In this manner, in the trajectory following control, the actual tire steering angle can be controlled without changing the steering angle.

CITATION LIST

Patent Literature

PTL 1: JP 2013-126854 A
PTL 2: JP 2010-126077 A
PTL 3: JP 2015-74425 A

SUMMARY OF INVENTION

Technical Problem

However, in the abovementioned method, a special system such as the steer-by-wire is required in implementing a trajectory following assist control. In addition, in the target trajectory following control by the steering angle, there is a case in which a following control maintaining traveling stability at the time of turning of the vehicle can not be implemented. For example, when the vehicle is turning in a state in which a lateral slip angle of a tire is large, even if an absolute value of the actual tire steering angle is increased so as to decrease a turning radius by the steering angle control, an expected yaw moment can not be generated, such that followability of the target trajectory is deteriorated. In addition, in turning of the vehicle in a state in which the absolute value of the actual tire steering angle is large, there is a possibility that the traveling stability will be deteriorated when vehicle behavior is disturbed by disturbance, or the like.

An object of the invention is to provide a vehicular motion control device and method capable of following a target trajectory so as to decrease a sense of incongruity felt by a driver and maintain traveling stability even when a vehicle is turning by using the fact that a turning radius of the vehicle is changed when a longitudinal acceleration of the vehicle that is turning is changed.

Solution to Problem

To solve the abovementioned object, a vehicular motion control device according to the invention includes: a target trajectory acquisition unit that acquires a target trajectory for a vehicle to travel; and a speed control unit that performs an increase or a decrease in a longitudinal acceleration generated in the vehicle, the longitudinal acceleration being set to be positive in a vehicle traveling direction, wherein when the vehicle deviates from the target trajectory during turning of the vehicle, the speed control unit performs a longitudinal acceleration control to increase or decrease the longitudinal acceleration.

In addition, in a vehicular motion control method according to the invention, a longitudinal acceleration control is performed to increase or decrease a longitudinal acceleration generated in a vehicle when the vehicle deviates from a target trajectory for the vehicle to travel during turning of the vehicle, the longitudinal acceleration being set to be positive in a vehicle traveling direction.

Advantageous Effects of Invention

According to the invention, a special system such as steer-by-wire is not required, and it is possible to follow target trajectory so as to decrease a sense of incongruity felt by a driver and maintain traveling stability even when a vehicle is turning.

Problems, configurations, and effects other than those described above are clarified from the following description for embodiments.

BRIEF DESCRIPTION OF DRAWINGS

FIG. 5 is a conceptual diagram illustrating a relationship between a target trajectory and a vehicle position of the vehicle mounted with the vehicular motion control device according to the invention at the time of turning of the vehicle, wherein FIG. 5(A) is a view illustrating a case in which the vehicle position is outside turning of the target trajectory and FIG. 5(B) is a view illustrating a case in which the vehicle position is inside turning of the target trajectory.

DESCRIPTION OF EMBODIMENTS

Hereinafter, a vehicular motion control device and method according to an embodiment of the invention are described with reference to the drawings.

Before concretely describing an embodiment, a speed control method based on a target trajectory and a vehicular motion state is briefly described with reference to FIGS. 1 to 6 in order to facilitate the understanding of the invention. In this embodiment, when the center point of gravity of a vehicle is set to the origin, a longitudinal direction of the vehicle is set to x, and a direction (lateral (transversal) direction of the vehicle) perpendicular to the longitudinal direction is set to y, an acceleration in the x direction is set to a longitudinal acceleration, and an acceleration in the y direction is set to a lateral acceleration. In addition, the longitudinal acceleration is set to be positive in a forward direction of the vehicle. That is, when the vehicle travels in the forward direction, the longitudinal acceleration increasing the speed is set to be positive. In addition, with respect to the lateral acceleration, when the vehicle travels in the forward direction, a lateral acceleration generated at the time of turning of the vehicle in a leftward direction (a counterclockwise direction) is set to be positive, and a lateral acceleration generated at the time of turning of the vehicle in an opposite direction is set to be negative. In addition, a turning radius of the vehicle at the time of turning of the vehicle in the leftward direction is set to be positive, and an inverse number to the turning radius is set to a vehicle traveling curvature. Likewise, with respect to the target trajectory, a turning radius of the vehicle at the time of turning of the vehicle in the leftward direction is set to be positive, and an inverse number to the turning radius is set to a target trajectory curvature. In addition, a steering angle at the time of turning of the vehicle in the leftward direction (counterclockwise direction) is set to be positive.

Figure 1:
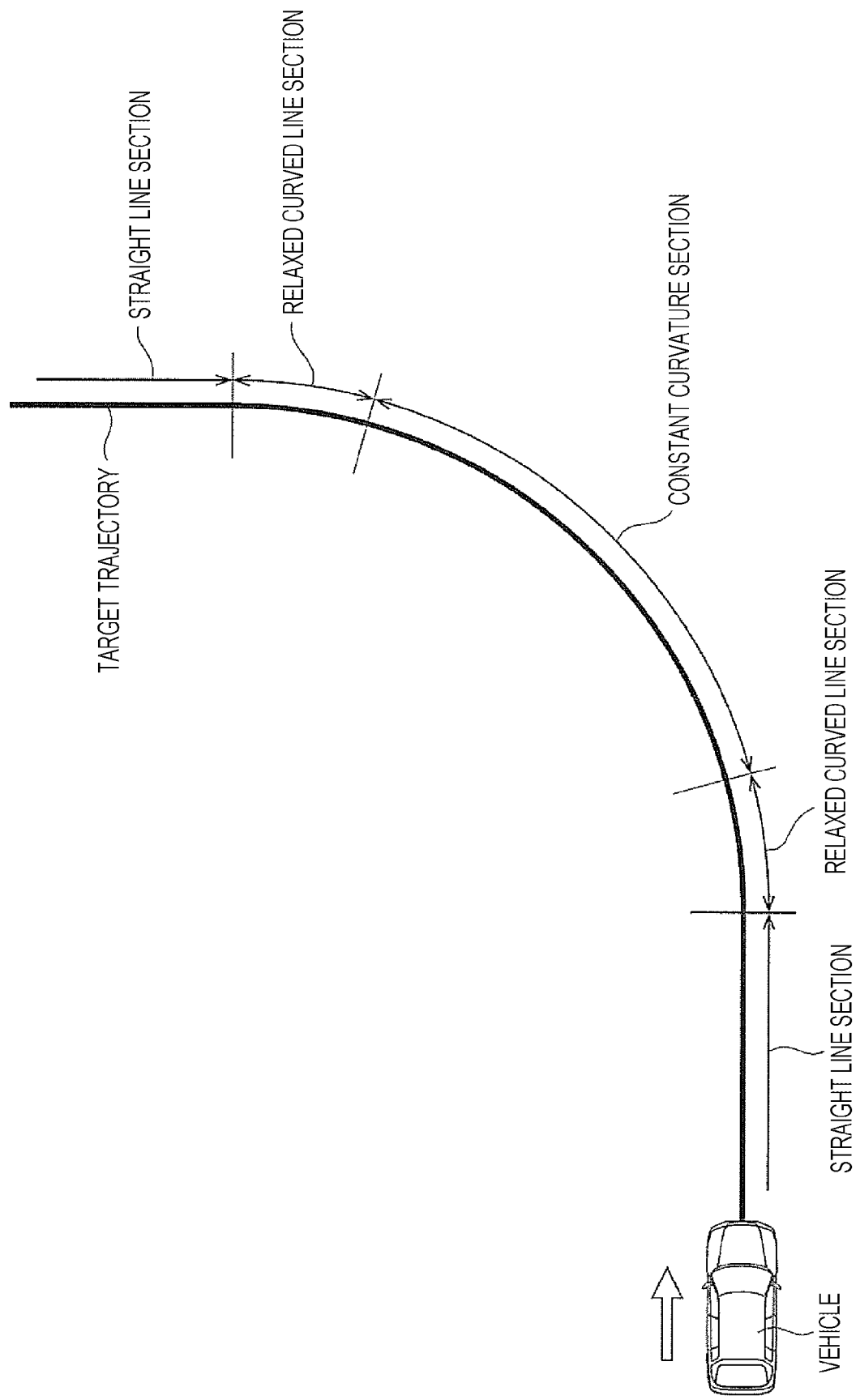
FIG. 1 is a conceptual diagram illustrating an example of a target trajectory of a vehicle mounted with a vehicular motion control device according to the invention at the time of turning of the vehicle.

FIG. 1 is a conceptual diagram illustrating a target trajectory (for example, a target trajectory set from camera information, a global positioning system (GPS), map information, or the like) having a straight line section, a relaxed curved line section, and a constant curvature section, and a vehicle traveling the target trajectory, in explaining a speed control of the invention.

Figure 2:
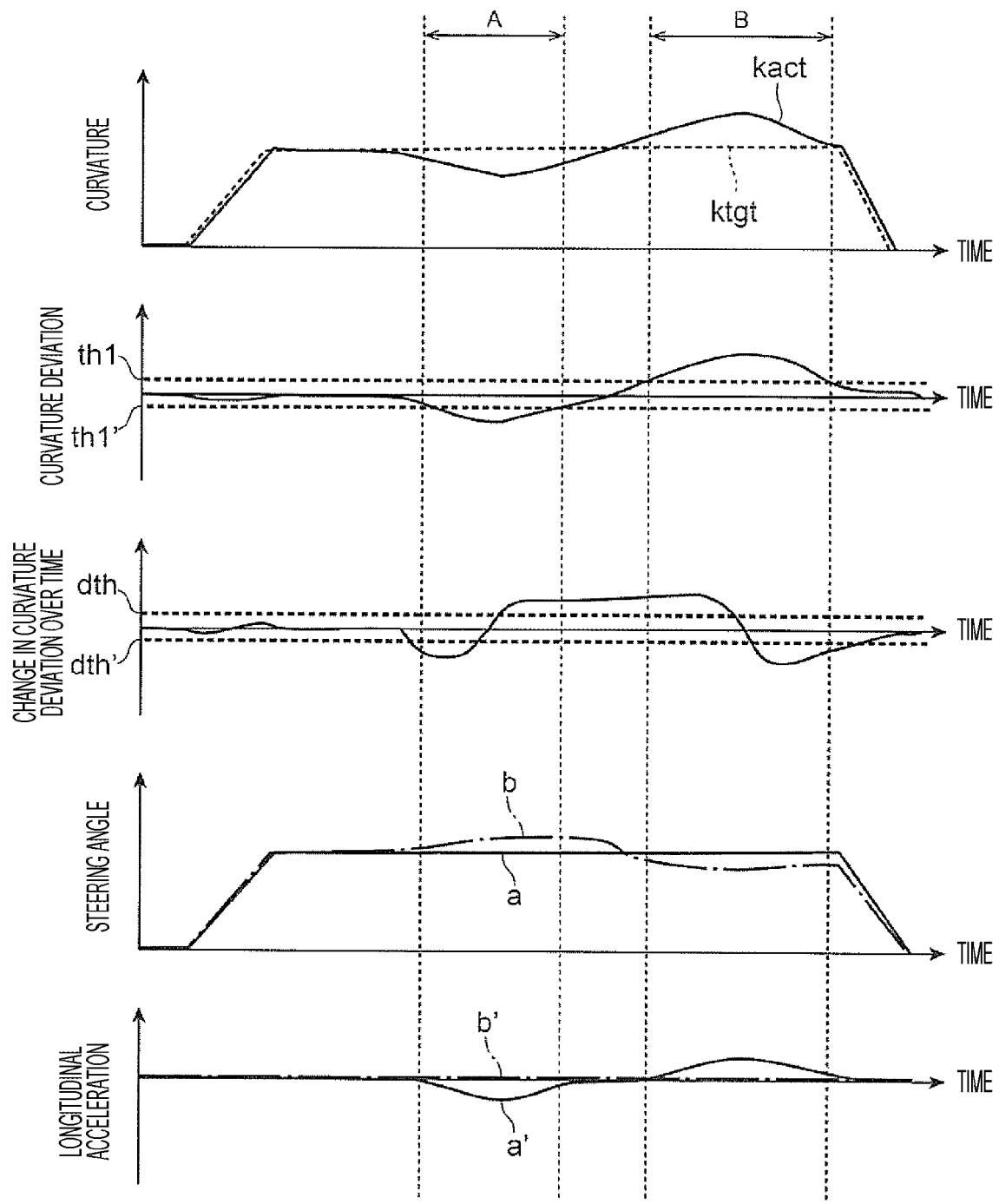
FIG. 2 is conceptual diagrams illustrating changes in a traveling trajectory (curvature), a steering angle, and a longitudinal acceleration of the vehicle mounted with the vehicular motion control device according to the invention over time at the time of turning of the vehicle.

FIG. 2, which illustrates one form of a speed control of invention, illustrates conceptual diagrams of changes in a vehicle traveling curvature, a steering angle, and a longitudinal acceleration over time, in a case of performing the speed control using a curvature of the target trajectory (target trajectory curvature) and a curvature of a traveling trajectory of the vehicle (vehicle traveling curvature), when the traveling trajectory of the vehicle deviates from the target trajectory due to any disturbance such as a road surface friction change or lateral wind during turning of the vehicle, when the vehicle travels the target trajectory illustrated in FIG. 1. For reference, conceptual diagrams of changes in a vehicle traveling curvature, a steering angle, and a longitudinal acceleration over time when a yaw moment control by the steering angle according to the related art is performed using the target trajectory curvature and the vehicle traveling curvature are also illustrated. In this embodiment, a vehicle of which an actual tire steering angle of a front wheel is changed in proportion to the steering angle is assumed.

Here, a and a' denoted by solid lines in FIG. 2 are changes in the steering angle and the longitudinal acceleration by the vehicular motion control device according to this embodiment over time, respectively, kact denoted by a solid line in a graph of a curvature is the vehicle traveling curvature, and ktgt denoted by a broken line is a target trajectory curvature acquired by a target trajectory acquisition unit (see FIGS. 8 and 16). b and b' denoted by alternate long and short dashed lines in FIG. 2 are changes in the steering angle and the longitudinal acceleration by the yaw moment control by the steering angle according to the related art over time, respectively.

As illustrated, in the related art, a following control to the target trajectory (target trajectory curvature in this drawing) is performed by changing the actual tire steering angle (of the front wheel) depending on a curvature deviation between the target trajectory curvature ktgt and the vehicle traveling curvature kact. In this case, in a vehicle that is not mounted with a special actuator such as steer-by-wire, as illustrated in FIG. 2, a steering angle may be changed due to a change in the actual tire steering angle, and the change in the steering angle may cause a sense of incongruity to be felt by a driver. In addition, at the time of turning of the vehicle, an effect of following the target trajectory by the change in the steering angle may be small, and traveling stability of the vehicle may be deteriorated. For example, when the steering angle control is performed to increase an absolute value of the actual tire steering angle in order to follow the target trajectory during turning, a lateral force generated in a tire is decreased due to an increase in the actual tire steering angle in the vicinity of a road surface friction limit, such that turning stability of the vehicle is deteriorated.

In this embodiment, the longitudinal acceleration of the vehicle is changed depending on the curvature deviation between the target trajectory curvature ktgt and the vehicle traveling curvature kact by using the fact that the turning radius of the vehicle is changed at the time of changing the longitudinal acceleration of the vehicle during turning without performing the steering angle control, such that the vehicle traveling curvature is changed so that the curvature deviation between the vehicle traveling curvature and the target trajectory curvature becomes small. In detail, in a vehicle turning in the same direction (rightward direction or leftward direction) as the target trajectory curvature, if the curvature deviation when the target trajectory curvature ktgt at a traveling position or in the vicinity of the front of the vehicle is larger than the vehicle traveling curvature kact is set to be negative, when the curvature deviation is smaller than a preset curvature deviation threshold value th1', the speed control is performed so that the longitudinal acceleration generated in the vehicle is decreased (region A in FIG. 2), and when the curvature deviation is larger than a preset curvature deviation threshold value th1, the speed control is performed so that the longitudinal acceleration generated in the vehicle is increased (region B in FIG. 2).

Here, as a method of increasing or decreasing the longitudinal acceleration, in addition to the curvature deviation, a change in the curvature deviation over time (change in curvature deviation over time) may be used. For example, when the curvature deviation is negative and the change in the curvature deviation over time is smaller than a preset threshold value dth', the speed control may be performed so that the longitudinal acceleration generated in the vehicle is decreased, when the curvature deviation is positive and the change in the curvature deviation over time is larger than a preset threshold value dth, the speed control may be performed so that the longitudinal acceleration generated in the vehicle is increased.

In addition, an increase or decrease amount in the longitudinal acceleration in the speed control may be changed depending on the curvature deviation or the change in the curvature deviation over time, or both of the curvature deviation and the change in the curvature deviation over time. For example, the larger the absolute value of the curvature deviation, the larger the decrease amount or the increase amount in the longitudinal acceleration, and the larger the absolute value of the change in the curvature deviation over time, the larger the decrease amount or the increase amount in the longitudinal acceleration. In addition, when the product of the curvature deviation and the change in the curvature deviation over time is negative, that is, signs of the curvature deviation and the change in the curvature deviation over time are different from each other, the decrease amount or the increase amount in the longitudinal acceleration may be set to be small as compared with when the product of the curvature deviation and the chancre in the curvature deviation over time is positive, that is, signs of the curvature deviation and the change in the curvature deviation over time are the same as each other.

In this way, when the longitudinal acceleration is decreased without performing the yaw moment control by the steering angle such as a change in the actual tire steering angle, the vehicle traveling curvature can be increased as compared with when the longitudinal acceleration is not decreased, and when the longitudinal acceleration is increased without performing the yaw moment control by the steering angle, the vehicle traveling curvature can be decreased as compared with when the longitudinal acceleration is not increased.

In addition, the following control to the target trajectory at the time of turning of the vehicle may be performed by adding the yaw moment control to the speed control of the invention.

Figure 3:
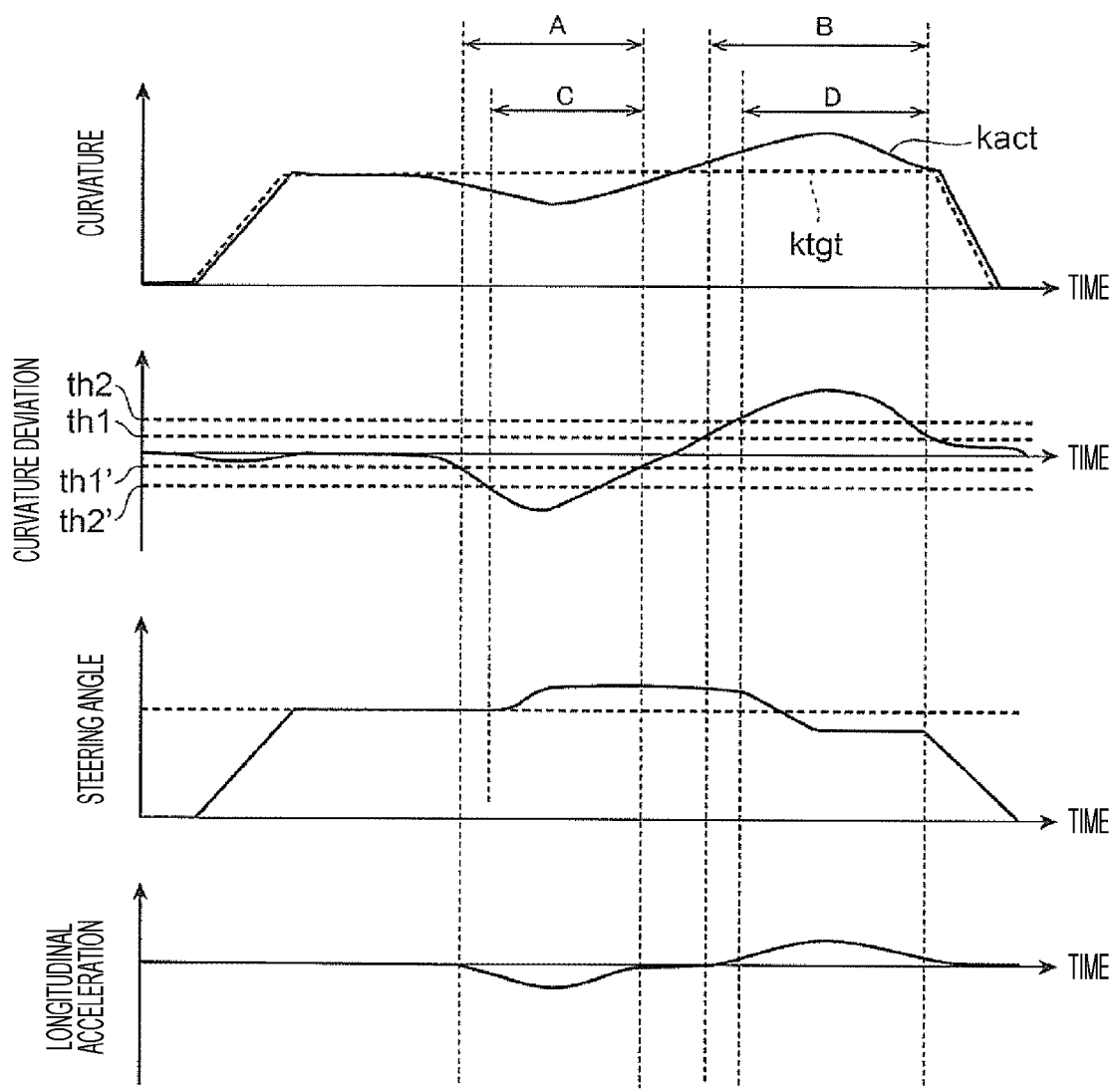
FIG. 3 is conceptual diagrams illustrating changes in a traveling trajectory (curvature), a steering angle, and a longitudinal acceleration of the vehicle mounted with the vehicular motion control device according to the invention over time at the time of turning of the vehicle.

FIG. 3 illustrates conceptual diagrams of changes in the vehicle traveling curvature, the steering angle, and the longitudinal acceleration over time at the time of adding the yaw moment control by the steering angle to the speed control of the invention.

Here, in addition to the speed control (regions A and B in FIG. 3), when the curvature deviation is smaller than a curvature deviation threshold value th2' preset so as to be a value equal to or less than the curvature deviation threshold value th1', the yaw moment control by the steering angle is performed so that the absolute value of the actual tire steering angle is increased depending on the curvature deviation (region C in FIG. 3), and when the curvature deviation is larger than a curvature deviation threshold value th2 preset to be a value equal to or larger than the curvature deviation threshold value th1, the yaw moment control by the steering angle is performed so that the absolute value of the actual tire steering angle is decreased depending on the curvature deviation (region D in FIG. 3).

As described above, in addition to the speed control, the yaw moment control by the steering angle is performed only when (the absolute value of) the curvature deviation is large, such that intervention of the yaw moment control by the steering angle is suppressed, and the yaw moment control by the steering angle is performed in a scene in which it is difficult to follow the target trajectory only by the speed control, such that it is possible to improve followability to the target trajectory.

In addition, as a method of combining the speed control and the steering angle control with each other, the speed control and the steering angle control may be switched depending on whether the curvature deviation is positive or negative. In detail, as illustrated in FIG. 4, when the curvature deviation is smaller than the curvature deviation threshold value th1', the yaw moment control by the steering angle may be performed so that the longitudinal acceleration generated in the vehicle is decreased (region A' in FIG. 4), and when the curvature deviation is larger than the curvature deviation threshold value th2, the yaw moment control by the steering angle may be performed so that the absolute value of the actual tire steering angle of the vehicle is decreased (region B' in FIG. 4).

In this way, when deviation from the target trajectory during turning occurs (is detected), a vehicle speed or the actual tire steering angle, or both of the vehicle speed and the actual tire steering angle can be decreased, such that the turning stability against disturbance such as a road surface friction change can be improved.

Figure 4:
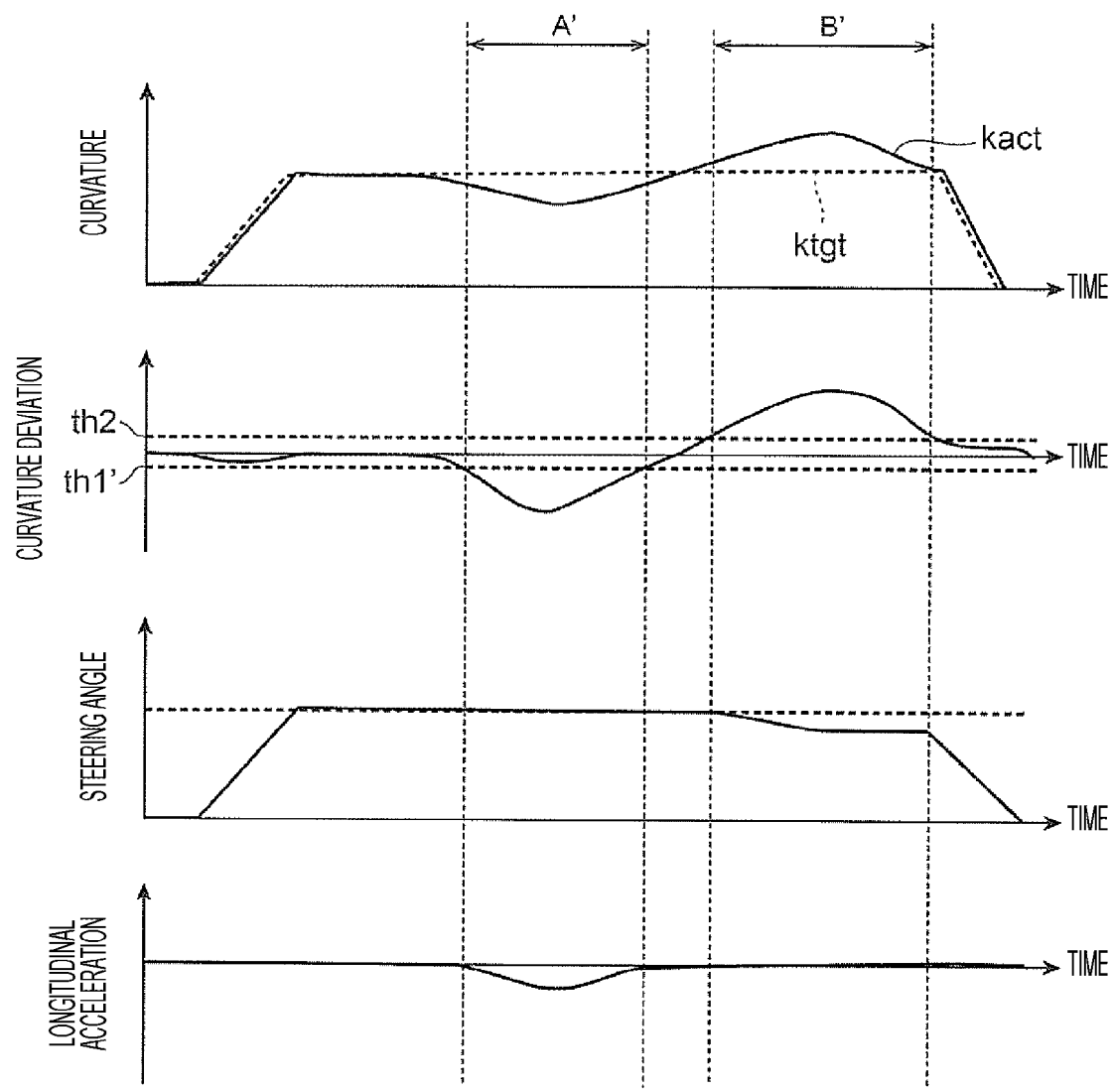
FIG. 4 is conceptual diagrams illustrating changes in a traveling trajectory (curvature), a steering angle, and a longitudinal acceleration of the vehicle mounted with the vehicular motion control device according to the invention over time at the time of turning of the vehicle.

Here, an example in which the speed control is performed on the basis of the deviation (curvature deviation) between the target trajectory curvature and the vehicle traveling curvature as an amount of deviation from the target trajectory is described in the embodiment illustrated in FIGS. 2 to 4, but the speed control may be performed using indices other than the curvature.

For example, as illustrated in FIG. 5(A), when the vehicle travels outside turning of the target trajectory, if a distance dout between the target trajectory and the center position of gravity of the vehicle is equal to or larger than a preset threshold value dout_th, the speed control is performed so that the longitudinal acceleration generated in the vehicle is decreased, and the speed control is performed so that the longitudinal acceleration generated in the vehicle is further decreased as the distance dout becomes large. In addition, as illustrated in FIG. 5(B), when the vehicle travels inside turning of the target trajectory, if a distance din between the target trajectory and the center position of gravity of the vehicle is equal to or larger than a preset threshold value din_th, the speed control is performed so that the longitudinal acceleration generated in the vehicle is increased, and the speed control is performed so that the longitudinal acceleration generated in the vehicle is further increased as the distance din becomes large.

Here, when the speed control is performed on the basis of distance dout or din, an increase or decrease amount in the longitudinal acceleration may be changed on the basis of the deviation (curvature deviation) between the vehicle traveling curvature and the target trajectory curvature. For example, when the curvature deviation is positive, the decrease amount in the longitudinal acceleration based on the distance dout is set to be small as compared with when the curvature deviation is negative. Alternatively, when the curvature deviation is negative, increase amount in the longitudinal acceleration based on the distance din is set to be small as compared with when the curvature deviation is positive. In addition, when the curvature deviation is negative, the threshold value dout_th is set to be smaller than the threshold value dout_th when the curvature deviation is positive. Alternatively, when the curvature deviation is positive, the threshold value din_th is set to be smaller than the threshold value din_th when the curvature deviation is negative.

As described above, a control amount in a scene in which the vehicle travels outside turning of the target trajectory with a positive curvature deviation or a scene in which the vehicle travels inside turning of the target trajectory with a negative curvature deviation can be suppressed by using both of the curvature deviation and the distance up to the target trajectory, such that the followability to the target trajectory can be improved.

Figure 6:
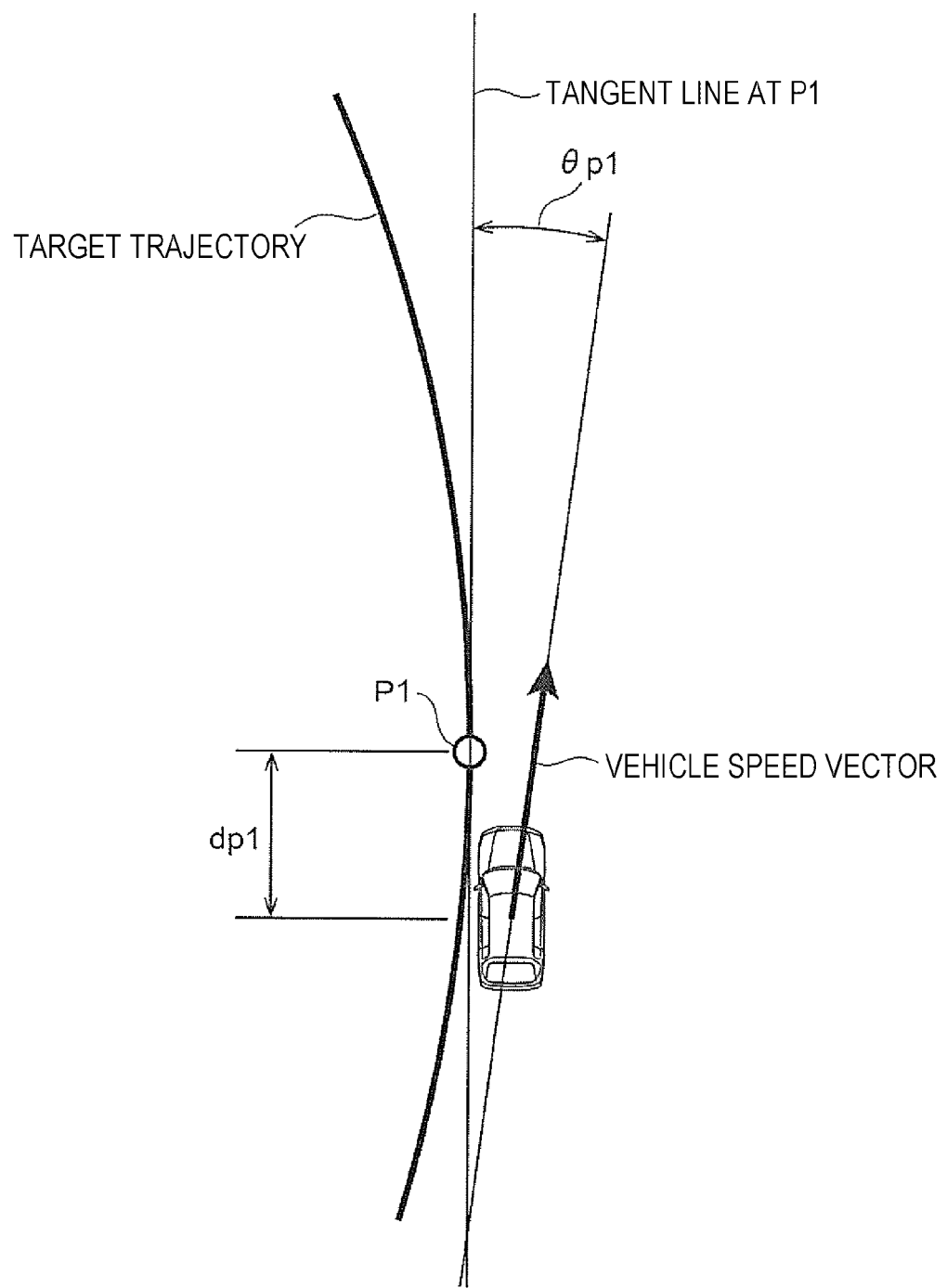
FIG. 6 is a conceptual diagram illustrating a relationship between a target trajectory and a vehicle position of the vehicle mounted with the vehicular motion control device according to the invention at the time of turning of the vehicle.

In addition, for example, as illustrated in FIG. 6, a point P1 is set at a position of a distance dp1 from the vehicle on the target trajectory in a vehicle traveling direction, and an angle formed by a tangent line of the target trajectory at the point P1 or a line segment (hereinafter, referred to as a tangent line) corresponding to the tangent line and a vehicle speed vector is set to θp1. In addition, when a change in the angle in the vehicle traveling direction when the vehicle travels by the distance dp1 is set to dα, if an absolute value of a difference between the angle θp1 and the angle dα is larger than any threshold value, the longitudinal acceleration of the vehicle may be increased or decreased. In detail, when a turning direction of the vehicle is the same as a turning direction of the target trajectory, a direction from the vehicle speed vector toward the tangent line is the same as the turning direction of the target trajectory, and the angle θp1 is larger than the angle dα or when the direction from the vehicle speed vector toward the tangent line is opposite to the turning direction of the target trajectory and the angle θp1 is smaller than the angle dα, if the absolute value of the difference between the angle θp1 and the angle dα is larger than any threshold value, the speed control is performed so that the longitudinal acceleration of the vehicle is decreased depending on a magnitude of the absolute value. In addition, when the turning direction of the vehicle is the same as the turning direction of the target trajectory, the direction from the vehicle speed vector toward the tangent line is the same as the turning direction of the target trajectory, and the angle θp1 is smaller than the angle dα or when the direction from the vehicle speed vector toward the tangent line is opposite to the turning direction of the target trajectory and the angle θp1 is larger than the angle dα, if the absolute value of the difference between the angle θp1 and the angle dα is larger than any threshold value, the speed control is performed so that the longitudinal acceleration of the vehicle is increased depending on a magnitude of the absolute value. Here, the distance dp1 is given as a function of the vehicle speed, and is preferably set to have a value increasing as the vehicle speed becomes large (fast), but may be a preset fixed value.

Here, if the distance dp1 is much smaller than a moving distance per unit time of the vehicle, the angle dα may be handled as a very small angle. That is, if the direction from the vehicle speed vector toward the tangent line is the same as the turning direction of the target trajectory and the angle θp1 is larger than any threshold value, the speed control is performed so that the longitudinal acceleration of the vehicle is decreased. In addition, if the direction from the vehicle speed vector toward the tangent line is opposite to the turning direction of the target trajectory and the angle θp1 is larger than any threshold value, the speed control may be performed so that the longitudinal acceleration of the vehicle is decreased.

In addition, when the speed control is performed on the basis of the angle θp1, the increase or decrease amount in the longitudinal acceleration may be changed depending on whether or not the vehicle travels outside turning of the target trajectory. For example, when the direction from the vehicle speed vector toward the tangent line is opposite to the turning direction of the target trajectory and the vehicle travels outside turning of the target trajectory, the decrease amount in the longitudinal acceleration is set to be small as compared with when the direction from the vehicle speed vector toward the tangent line is the same as the turning direction of the target trajectory and the vehicle travels outside turning of the target trajectory. In addition, when the direction from the vehicle speed vector toward the tangent line is the same as the turning direction of the target trajectory and the vehicle travels inside turning of the target trajectory, the increase amount in the longitudinal acceleration is set to be small as compared with when the direction from the vehicle speed vector toward the tangent line is opposite to the turning direction of the target trajectory and the vehicle travels inside turning of the target trajectory.

Figure 5:
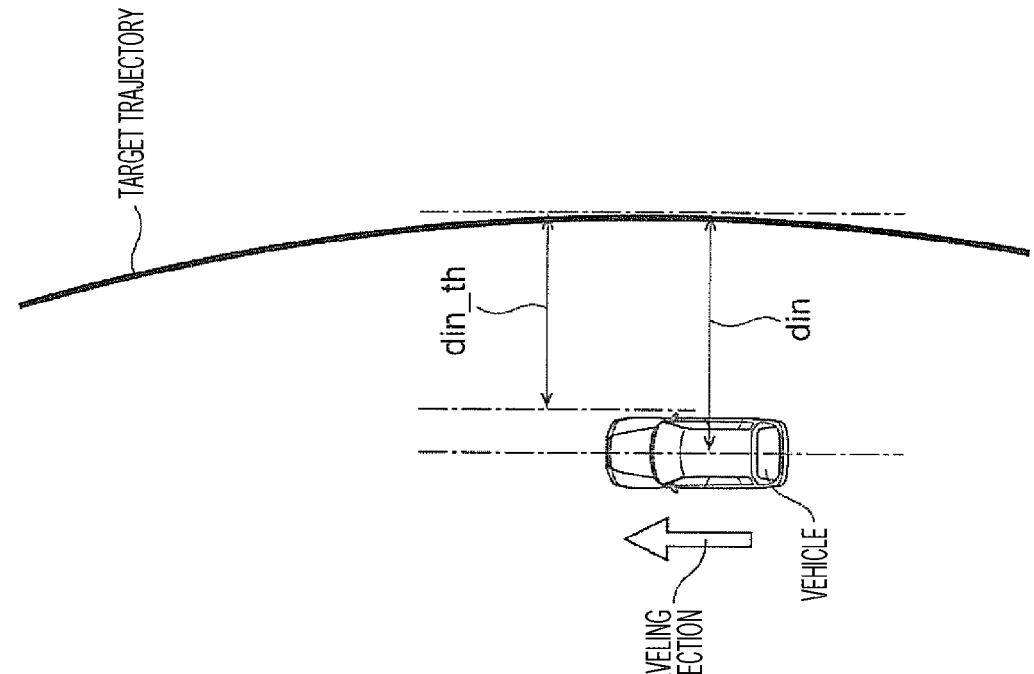

Even in the case of using the indices illustrated in FIGS. 5 and 6, a combination between the speed control and the yaw moment control is possible as in the case of using the curvature deviation described above, and the invention is not limited only to the speed control. In addition, in this embodiment, the vehicle in which the actual tire steering angle of the front wheel is changed by the change in the steering angle is described, but this speed control can also be applied to a vehicle mounted with steer-by-wire in which the steering angle and the actual tire steering angle are separated from each other or a vehicle having a rear wheel steering mechanism capable of controlling an actual tire steering angle of a rear wheel, and can also be combined with the yaw moment control as in the embodiment described above. In addition, in performing the yaw moment control of the vehicle, a direct yaw moment control for generating a yaw moment in the vehicle by a difference in a braking or driving force (braking force or driving force) between left and right tires and the speed control described in this embodiment may be combined with each other. In detail, in the region C in FIG. 3, instead of increasing the actual tire steering angle, different braking or driving forces may be generated in right tires of the vehicle (traveling direction) and left tires of the vehicle (traveling direction) so that the yaw moment is generated in the same direction as the turning direction of the vehicle is generated by the direct yaw moment control, and in the region D in FIG. 3, instead of decreasing the actual tire steering angle, different braking or driving forces may be generated in the right tires of the vehicle (traveling direction) and the left tires of the vehicle (traveling direction) so that the yaw moment is generated in the direction opposite to the turning direction of the vehicle by the direct yaw moment control. In this case, it is preferable to perform the direct yaw moment control so that the longitudinal acceleration generated in the vehicle by the braking or driving forces by the direct yaw moment control becomes approximately the same as the longitudinal acceleration by the speed control, but there are limitations in braking or driving forces that can be generated depending on a controllable actuator. For this reason, it is sufficient that an intended yaw moment can be generated in the vehicle by the direct yaw moment control, and the longitudinal acceleration by the direct yaw moment control does not need to necessarily coincide with the longitudinal acceleration by the speed control.

In addition, the increase or decrease amount in the longitudinal acceleration generated in the vehicle by this speed control may be changed depending on a vehicular motion state. For example, if the lateral acceleration generated in the vehicle is constant, as the vehicle speed becomes large, the increase or decrease amount in the longitudinal acceleration with respect to the curvature deviation is set to be large. In addition, if the vehicle speed is constant, as the absolute value of the lateral acceleration generated in the vehicle becomes large, the increase or decrease amount in the longitudinal acceleration with respect to the curvature deviation is set to be small.

In addition, the increase or decrease amount in the longitudinal acceleration generated in the vehicle by this speed control may be changed depending on a driving manner of the vehicle or response characteristic of a yaw rate of the vehicle accompanied by the change in the longitudinal acceleration at the time of turning of the vehicle. For example, in a vehicle in which the yaw rate of the vehicle is significantly changed by the increase or the decrease in the longitudinal acceleration, the increase or decrease amount in the longitudinal acceleration depending on the deviation from the target trajectory is set to be small as compared with a vehicle in which a change amount in the yaw rate is small.

In addition, it is preferable that the longitudinal acceleration generated in the vehicle by this speed control is set to be in a range in which excessive slip or a rapid decrease in a lateral force of the tire is not caused. In detail, it is preferable that the longitudinal acceleration generated in the vehicle as a result of increasing or decreasing the longitudinal acceleration by this speed control is set to be in a range of about $-1$ m/s$^2$ to about 1 m/s$^2$.

However, the increase amount in the longitudinal acceleration generated in the vehicle by this speed control is set to be in a range that does not exceed a longitudinal acceleration Gxdrv generated by an accelerator pedal manipulation of the driver when the speed control is performed by the driver himself/herself and a speed upper limit value Vlmt set in the vehicle or a longitudinal acceleration upper limit value GxMax of a system performing the speed control instead of the driver, such as an adaptive cruise control or an automatic driving system, when the speed control is performed by the system.

In addition, it is preferable that this speed control by the acceleration control is performed only when the turning direction of the vehicle and the turning direction of the target trajectory are the same as each other and the increase or the decrease in the longitudinal acceleration by this speed control is not performed when the turning direction of the vehicle is opposite to the turning direction of the target trajectory.

First Embodiment

Hereinafter, components and operations of a vehicular motion control device according to a first embodiment, which is a specific example of the invention, are described with reference to FIGS. 7 to 14.

First, components of a vehicle mounted with the vehicular motion control device according to the first embodiment of the invention and the vehicular motion control device are described with reference to FIGS. 7 and 8.

Figure 7:
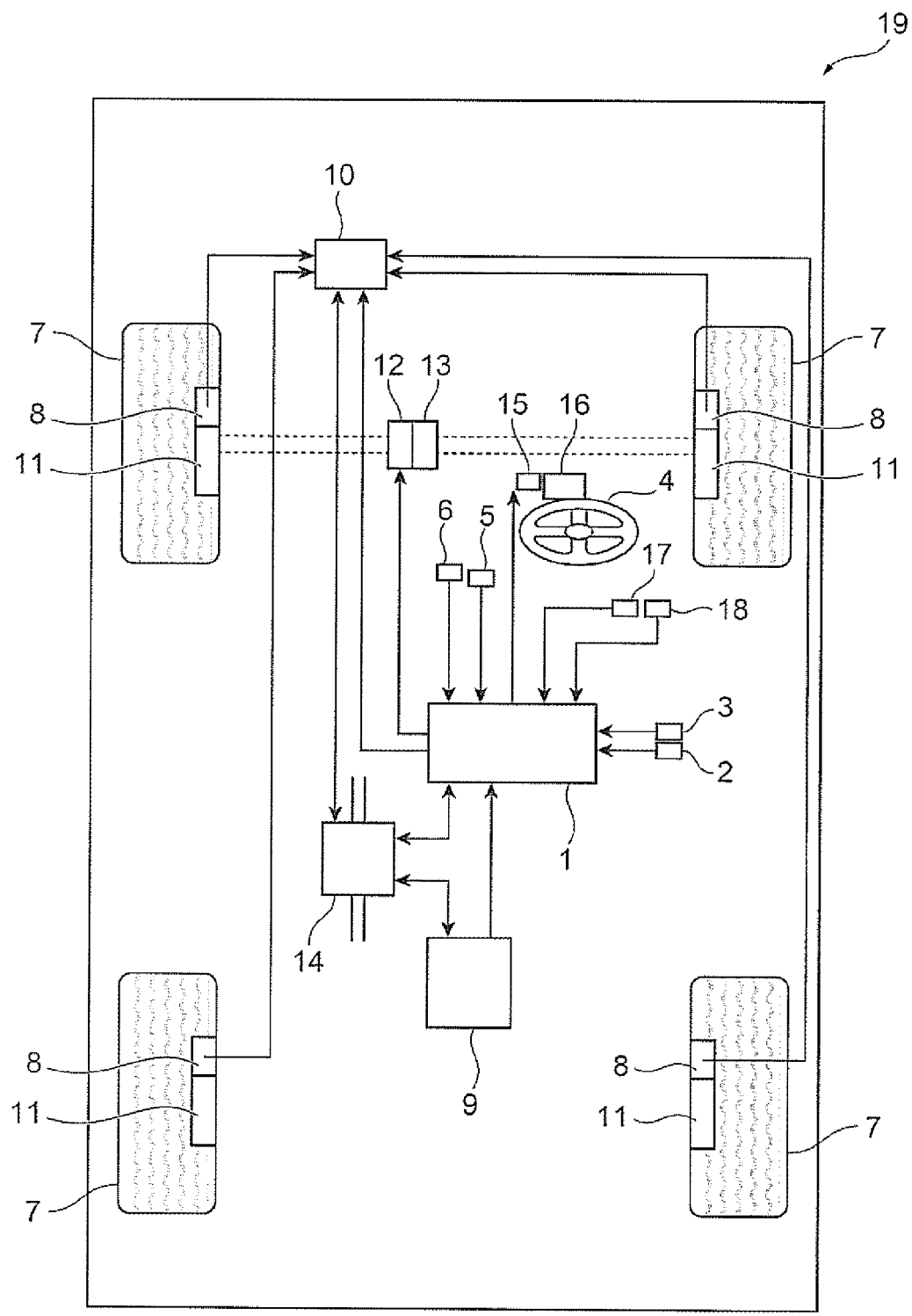
FIG. 7 is a conceptual diagram illustrating internal components of a vehicle mounted with a vehicular motion control device according to a first embodiment of the invention.

FIG. 7 illustrates a configuration diagram of the vehicle mounted with the vehicular motion control device according to the first embodiment of the invention.

The vehicular motion control device 1 according to this embodiment is mounted in a vehicle 19, performs calculation required for a speed control and/or a yaw moment control on the basis of information acquired from sensors (an acceleration sensor 2, a gyro sensor 3, and wheel speed sensors 8) acquiring vehicular motion state information, sensors (a steering angle sensor 5, a brake pedal sensor 17, and an accelerator pedal sensor 18) acquiring driver manipulation information, and sensors (a course shape acquisition sensor 6 and an own vehicle position detection sensor 9) acquiring own vehicle traveling road information, and transmits drive signals to the respective control units (a brake control unit 10, a drive torque control unit 12, and a steering angle control unit 15) performing a drive control on actuators (brake actuators 11, a drive actuator 13, and a steering angle control actuator 16) capable of controlling a longitudinal acceleration and/or a yaw moment generated in the vehicle through a communication line 14 on the basis of a calculation result.

Here, the sensors acquiring the vehicular motion state information may be sensors or means that can acquire a vehicle speed, a longitudinal acceleration, a lateral acceleration, and a yaw rate, but are not limited thereto. For example, the vehicle speed may be acquired by differentiating position information obtained by a global positioning system (GPS). In addition, the yaw rate, the longitudinal acceleration, and the lateral acceleration of the vehicle may be acquired using an image acquisition sensor such as a camera. In addition, the vehicular motion control device 1 may not directly have inputs of the sensors. For example, required information may be acquired from a separate control unit (for example, the brake control unit 10) through the communication line 14.

The sensor acquiring the driver manipulation information may be sensors acquiring a manipulation amount of a steering wheel 4 and manipulation amounts of a brake pedal (not illustrated) and an accelerator pedal (not illustrated) by a driver, and the vehicular motion control device 1 may not directly have inputs of the sensors, similarly to the acquisition of the vehicular motion state information described above. For example, required information may be acquired from a separate control unit (for example, the brake control unit 10) through the communication line 14.

As the sensors acquiring the own vehicle traveling road information, the GPS can be used as the own vehicle position detection sensor 9, and a sensor capable of acquiring traveling route information of an own vehicle, such as a navigation system, can be used as the course shape acquisition sensor 6. Here, the sensors acquiring the own vehicle traveling road information may be means that can acquire a course shape in a traveling direction of the own vehicle, but are not limited thereto. For example, a method of acquiring a course shape in front of the own vehicle by communication with a data center or an apparatus installed on a road and transmitting road information may be used, or a method of acquiring an image in front of or around the own vehicle or images in front of and around the own vehicle by an image capturing means such as a camera to acquire a course shape in front of the own vehicle may be used. Alternatively, a method of acquiring a course shape from a unit calculating the course shape in the traveling direction of the own vehicle through the communication line 14 by any one or a combination of these means may be used.

An acceleration or deceleration actuator capable of controlling the longitudinal acceleration generated in the vehicle is an actuator capable of controlling the longitudinal acceleration generated in the vehicle 19 by controlling a force generated between tires 7 and a road surface. For example, various acceleration or deceleration actuators capable of controlling the longitudinal acceleration such as a combustion engine capable of controlling the longitudinal acceleration of the vehicle 19 by controlling a combustion state to control braking or driving torques applied to the tires 7, an electric motor capable of controlling the longitudinal acceleration of the vehicle 19 by controlling a current to control braking or driving torques applied to the tires 7, a transmission capable of controlling the longitudinal acceleration of the vehicle 19 by changing a gear ratio when power is transferred to the respective wheels, or a friction brake for generating the longitudinal acceleration by pressing brake disks with brake pads of the respective wheels can be used.

As actuators capable of controlling the yaw moment, a steering angle actuator (steering angle control unit) capable of controlling an actual tire steering angle, such as an electric power steering capable of generating a steering torque of the steering wheel 4 by a motor or an electric hydraulic power steering capable of generating a steering torque by a combination of an electric motor and a hydraulic pressure or a direct yaw moment actuator (direct yaw moment control unit) capable of giving a difference between braking or driving forces generated in right tires of the vehicle traveling direction and left tires of the vehicle traveling direction can be used.

The vehicular motion control device 1 includes a calculation device having a storage area, a calculation processing capability, and signal input and output means, calculates a longitudinal acceleration command value to be generated in the vehicle 19 from information obtained by the vehicular motion state information, the driver manipulation information, and the own vehicle traveling road information, and transmits the longitudinal acceleration command value to a drive controller of the acceleration or deceleration actuator using the acceleration or deceleration actuator capable of generating a longitudinal acceleration that becomes the longitudinal acceleration command value as a longitudinal acceleration generating means. In addition, the vehicular motion control device 1 calculates a yaw moment command value to be generated in the vehicle 19 from the information obtained by the vehicular motion state information, the driver manipulation information, and the own vehicle traveling road information, and transmits the yaw moment command value to a drive controller of a yaw moment control actuator using the yaw moment control actuator capable of generating a yaw moment that becomes the yaw moment command value as a yaw moment generating means.

Here, the transmitted signal is not the longitudinal acceleration itself, but may be a signal that can implement the longitudinal acceleration command value by the acceleration or deceleration actuator. Likewise, the signal is not the yaw moment itself, but may be a signal that can implement the yaw moment command value by the yaw moment control actuator.

For example, when the acceleration or deceleration actuator is the combustion engine, a braking or driving torque command value that can implement the longitudinal acceleration command value is transmitted to the drive torque control unit 12. In addition, a drive signal of the combustion engine implementing the longitudinal acceleration command value may be directly transmitted to a control actuator of the combustion engine without passing through the drive torque control unit 12. In addition, when a hydraulic friction brake pressing the brake pads to the brake disks by a hydraulic pressure is used, a hydraulic pressure command value implementing the longitudinal acceleration command value is transmitted to the brake control unit 10. In addition, a drive signal of a hydraulic friction brake drive actuator implementing the longitudinal acceleration command value may be directly transmitted to the hydraulic friction brake drive actuator without passing through the brake control unit 10.

In addition, when the longitudinal acceleration command value is implemented, the acceleration or deceleration actuator performing a drive control depending on the longitudinal acceleration command value may be changed.

For example, when the combustion engine and the hydraulic friction brake are provided as the acceleration or deceleration actuator, if the longitudinal acceleration command value is in a range that can be implemented by a braking or driving torque control of the combustion engine, a drive control is performed on the combustion engine, and if the longitudinal acceleration command value is a negative value which is in a range that can not be implemented by the braking or driving torque control of the combustion engine, a drive control is performed on the hydraulic friction brake together with the combustion engine. In addition, when the electric motor and the combustion engine are provided as the acceleration or deceleration actuator, if a change in the longitudinal acceleration over time is large, a drive control may be performed on the electric motor, and if a change in the longitudinal acceleration over time is small, a drive control may be performed on the combustion engine. In addition, at ordinary times, a drive control may be performed on the longitudinal acceleration command value by the electric motor, and when the longitudinal acceleration command can not be implemented by the electric motor due to a state of a battery, or the like, a drive control may be performed on another acceleration or deceleration actuator (the combustion engine, the hydraulic friction brake, or the like).

In addition, as the communication line 14, different communication lines and communication protocols may be used depending on signals. For example, Ethernet (registered trademark) may be used for communication with the sensor acquiring the own vehicle traveling road information that needs to exchange massive data, and a controller area network (CAN) may be used for communication with the respective actuators.

Figure 8:
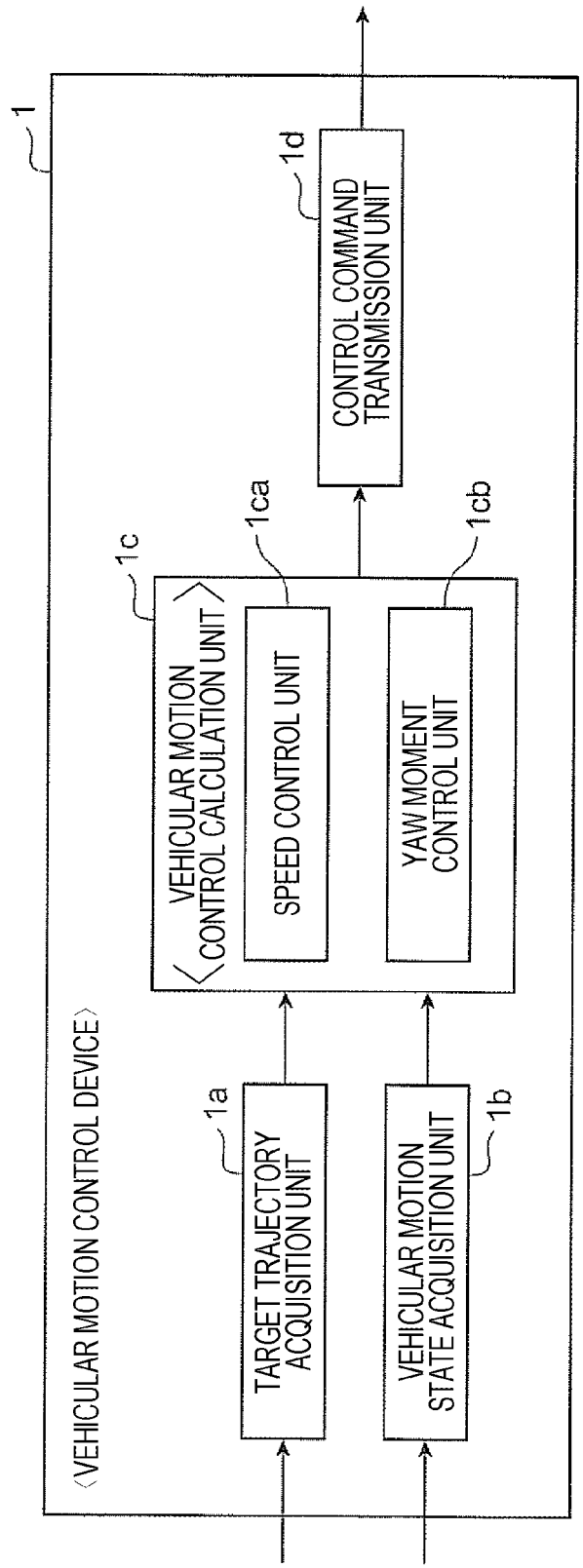
FIG. 8 is a block diagram illustrating internal components of the vehicular motion control device according to the first embodiment of the invention.

FIG. 8 illustrates a block diagram of the vehicular motion control device 1 according to the first embodiment of the invention.

As illustrated, the vehicular motion control device 1 consists of a target trajectory acquisition unit 1a, a vehicular motion state acquisition unit 1b, a vehicular motion control calculation unit 1c, and a control command transmission unit 1d.

The target trajectory acquisition unit 1a acquires a target trajectory for the vehicle 19 to travel, from the own vehicle traveling road information. Here, a method of creating the target trajectory may be a method of creating the target trajectory from a course shape (geometric shape) on which the own vehicle travels, a method of acquiring a past traveling data trajectory of a road surface on which the own vehicle travels by communication with the data center and creating the target trajectory on the basis of the acquired past traveling data trajectory, or a method of acquiring a traveling data trajectory of a vehicle (preceding vehicle) traveling in front of the own vehicle (traveling direction) and creating the target trajectory on the basis of the acquired traveling data trajectory.

The vehicular motion state acquisition unit 1b acquires vehicular motion states (a travel speed, a turning state, and a driver manipulation amount) from the vehicular motion state information.

The vehicular motion control calculation unit 1c includes a speed control unit 1ca performing an increase or a decrease (speed control by an acceleration control) in a longitudinal acceleration generated in the vehicle 19 and a yaw moment control unit 1cb performing a yaw moment control of the vehicle 19, calculates a longitudinal acceleration command value by the speed control or both of a longitudinal acceleration command value by the speed control and a yaw moment command value by the yaw moment control on the basis of information obtained by the target trajectory acquisition unit 1a and the vehicular motion state acquisition unit 1b, and transmits calculation results to the control command transmission unit 1d.

The control command transmission unit 1d transmits drive command values to the respective control units (the brake control unit 10, the drive torque control unit 12, and the steering angle control unit 15) performing the drive control on the actuators (the brake actuators 11, the drive actuator 13, and the steering angle control actuator 16) capable of controlling the longitudinal acceleration and/or the actual tire steering angle on the basis of the longitudinal acceleration command value or both of the longitudinal acceleration command value and the yaw moment command value created by the vehicular motion control calculation unit 1c.

Figure 9:
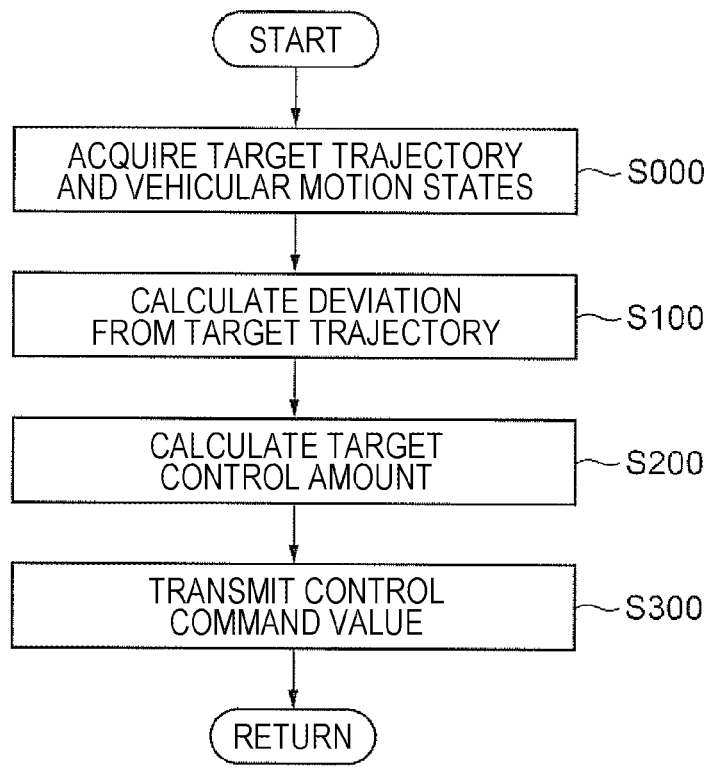
FIG. 9 is a calculation flowchart of the vehicular motion control device according to the first embodiment of the invention.

FIG. 9 illustrates a calculation flowchart in the vehicular motion control device 1 according to the first embodiment.

Figure 10:
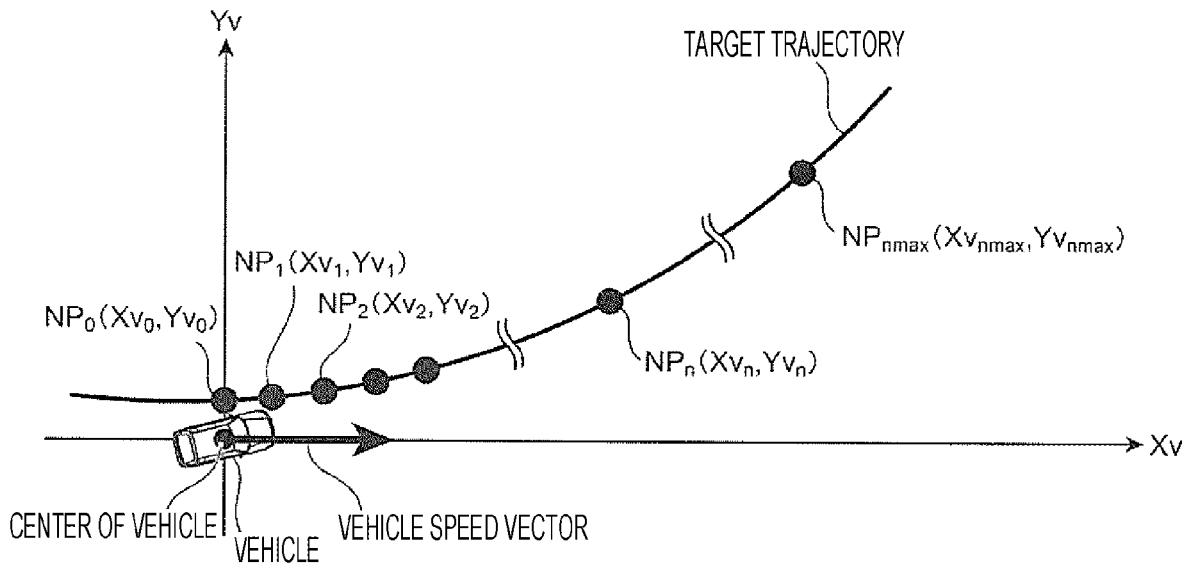
FIG. 10 is a conceptual diagram illustrating a target trajectory in the vehicular motion control device according to the first embodiment of the invention.

First, in S000, as described above, the target trajectory and the vehicular motion states are acquired. Here, the target trajectory is changed as node point position data $NP_n(Xv_n, Yv_n)$ on a coordinate having the origin corresponding to the center position of gravity of the vehicle, an Xv axis in which a direction of a vehicle speed vector is set to be positive, and a Yv axis perpendicular to the Xv axis, as illustrated in FIG. 10. "n" is an integer increased from 0, which is a point closest to the vehicle, to 1, 2, . . . , nmax toward a traveling direction of the own vehicle. In addition, nmax is a maximum value of an acquirable node point position data number n. In addition, a $Yv_0$ which is a Yv axis component of $NP_0$ is a lateral deviation of the vehicle.

Then, in S100, a deviation from the target trajectory is calculated from the target trajectory and the vehicular motion states acquired in S000. In this embodiment, a method of calculating the deviation from the target trajectory using the angle θp1 formed by the tangent line of the target trajectory at the point P1 set at the position of the distance dp1 from the vehicle on the target trajectory in the vehicle traveling direction and the vehicle speed vector illustrated in FIG. 6 described above is described.

Figure 11:
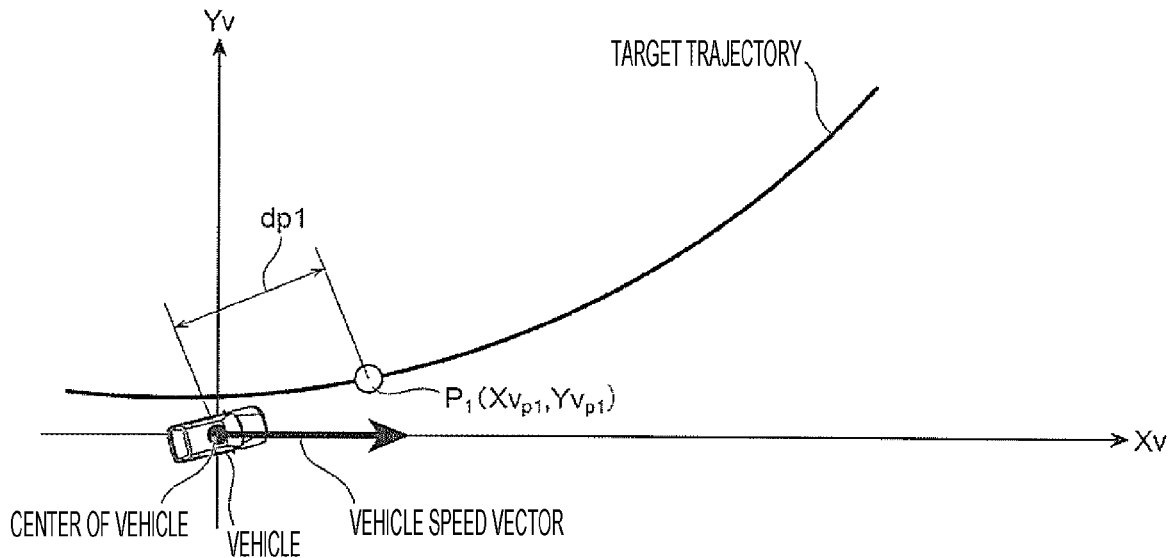
FIG. 11 is a conceptual diagram illustrating a target trajectory in the vehicular motion control device according to the first embodiment of the invention.

As illustrated in FIG. 11, the point P1 is set at the position of the distance dp1 from the vehicle on the target trajectory. In addition, when an interval between node points NPn is sufficiently narrow with respect to the distance dp1, a node point NPn existing in the vicinity of the distance dp1 from the vehicle may be set as the point P1.

Here, the distance dp1 is set as a function of the vehicle speed V, and is given by the following Formula (1) using a preset front gaze time $T_{p1}$. Here, since the point P1 is set in the vicinity of the vehicle, the front gaze time $T_{p1}$ is set to a value of at most about 2 seconds.

[Mathematical Formula 1]

$$dp1 = T_{p1} \cdot V \quad (1)$$

Figure 12:
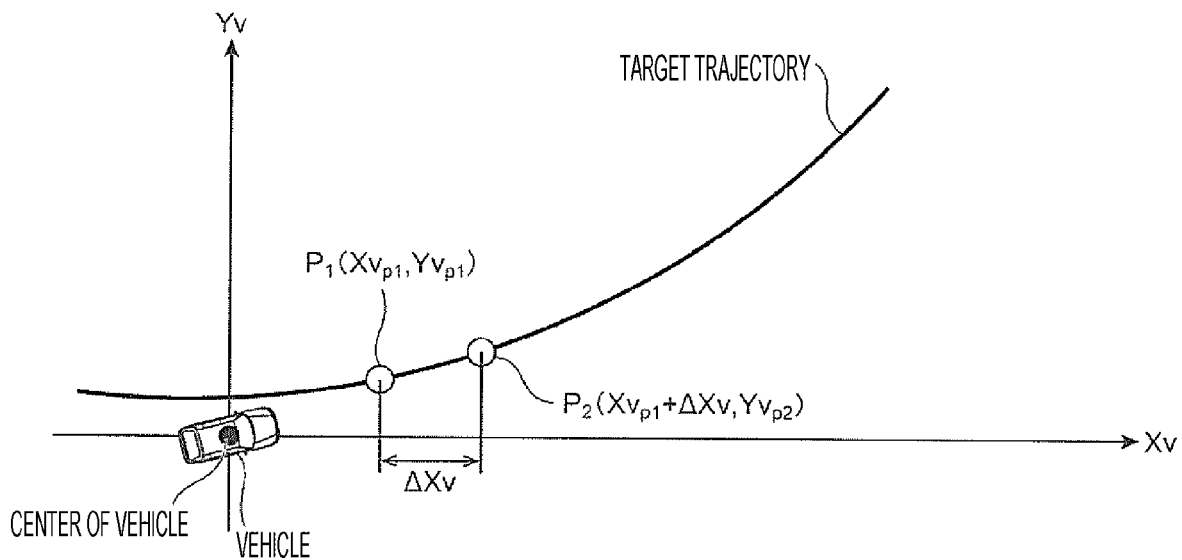
FIG. 12 is a conceptual diagram illustrating a target trajectory in the vehicular motion control device according to the first embodiment of the invention.

After the point P1 is set, the angle θp1 formed by the tangent line of the target trajectory at the point P1 and the vehicle speed vector is calculated. The angle θp1 is given by the following Formula (2) from a Yv axis component Yvp2 of a point P2 on the target trajectory at a position advanced by a preset distance ΔXv in the Xv axis direction from the point P1 and a Yv axis component Yvp1 of the point P1, as illustrated in FIG. 12. Here, a method of using the preset distance ΔXv is described as a method of calculating the angle θp1, but the angle θp1 may be created using two node points in the vicinity of the point P1 when the interval between the node points NPn is approximately the same as ΔXv.

[Mathematical Formula 2]

$$\theta p1 = a\tan\left(\frac{Y_{vp2} - Y_{vp1}}{\Delta X_v}\right) \quad (2)$$

In addition, the change dα in the angle, in the traveling direction, of the vehicle speed vector of the own vehicle at the forward gaze time $T_{p1}$ is given by the following Formula (3) using the forward gaze time $T_{p1}$ of the vehicle speed V and a lateral acceleration Gy, assuming that a change in the vehicle speed V at the forward gaze time $T_{p1}$ is sufficiently small.

[Mathematical Formula 3]

$$d\alpha = \frac{G_y \cdot T_{p1}}{V} \quad (3)$$

An angle deviation $d\theta\alpha$ from the target trajectory can be given by the following Formula (4) from the angle $\theta p1$ and the change $d\alpha$ in the angle.

[Mathematical Formula 4]

$$d\theta\alpha = \theta p1 - d\alpha \quad (4)$$

After the calculation, the angle deviation $d\theta\alpha$ is transmitted together with the target trajectory information.

In S200, a target control amount is calculated using target trajectory information, the angle deviation $d\theta\alpha$, and vehicular motion state information. In this embodiment, a case of performing the speed control and the yaw moment control by the steering angle illustrated in FIG. 3 described above is described.

Figure 13:
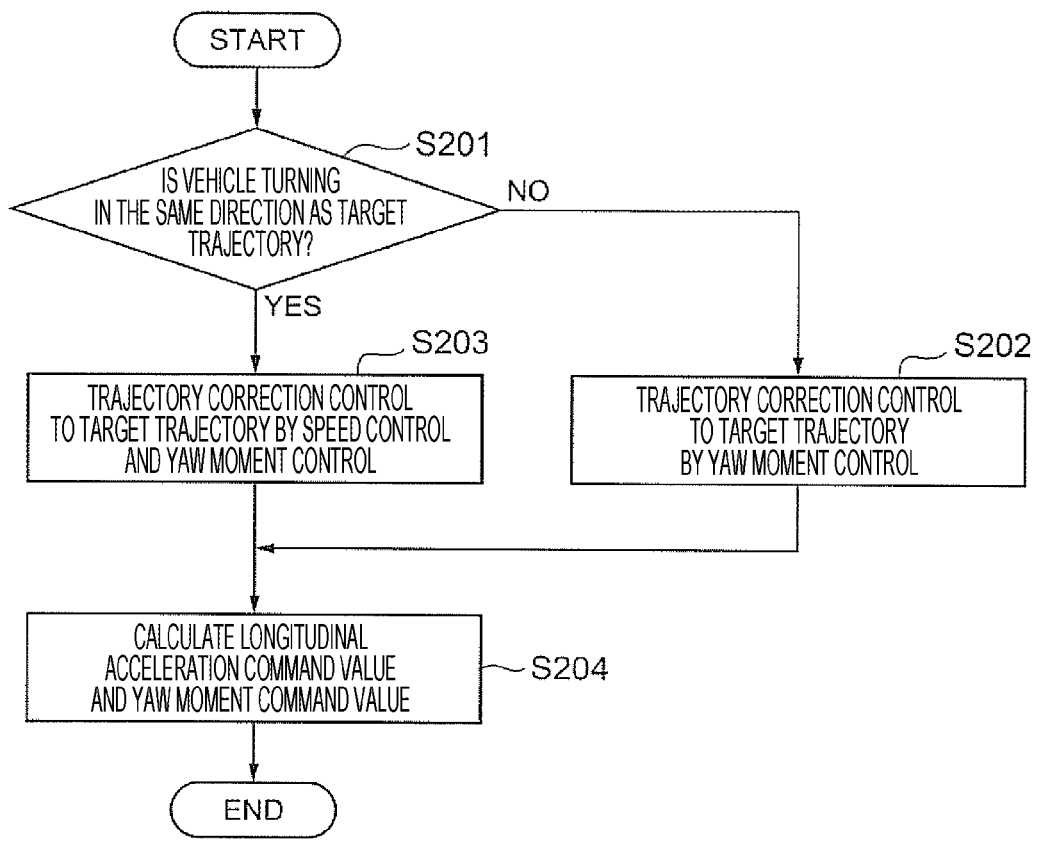
FIG. 13 is a calculation flowchart of target control amount calculation of the vehicular motion control device according to the first embodiment of the invention.

FIG. 13 illustrates a calculation flowchart in S200 described above.

In S201, it is determined whether or not the vehicle is turning in the same direction as the target trajectory. As a determination method, if the vehicle speed is a positive value, an absolute value of a target trajectory curvature in the vicinity the own vehicle is equal to or larger than a preset threshold value, and a turning direction of the vehicle detected from the vehicular motion state is the same as a turning direction of the target trajectory, it is determined that the vehicle is turning in the same direction as the target trajectory, a process proceeds to S203. Otherwise, a process proceeds to S202.

In S202, a trajectory correction control to the target trajectory is performed when the vehicle is turning on a straight road or in a direction different from the target trajectory. Since it is difficult to correct a traveling trajectory by the speed control under these conditions, an increase or decrease amount in the longitudinal acceleration is set to zero, and an increase or decrease amount in a yaw moment is calculated so that a yaw moment decreasing the angle deviation $d\theta\alpha$ and a lateral deviation $Yv_0$ is generated in the vehicle.

On the other hand, in S203, a trajectory correction control by the speed control and the yaw moment control to the target trajectory in a turning path is performed. Here, a lateral deviation $Yv_0$ when the vehicle travels outside turning of the target trajectory is set to be positive, and a lateral deviation $Yv_0$ when the vehicle travels inside turning of the target trajectory is set to be negative.

Figure 14:
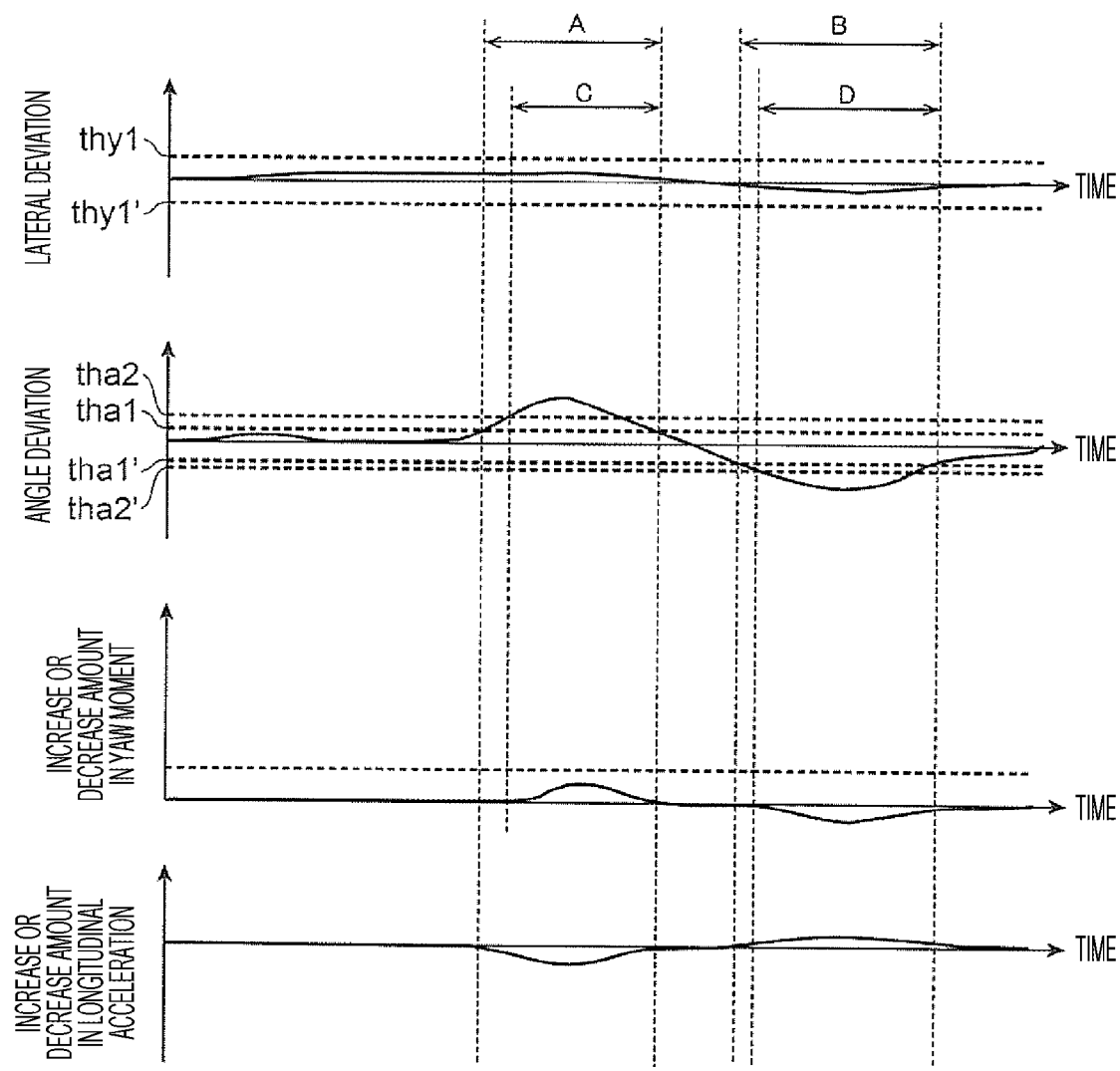
FIG. 14 is conceptual diagrams illustrating calculation results of an increase or decrease amount in a yaw moment and an increase or decrease amount in a longitudinal acceleration in time series in the vehicular motion control device according to the first embodiment of the invention.

FIG. 14 illustrates an increase or decrease amount in a longitudinal acceleration by a speed control and an increase or decrease amount in a yaw moment by a yaw moment control based on the lateral deviation $Yv_0$ and the angle deviation $d\theta\alpha$. Here, the increase or decrease amount in the yaw moment is set to be positive in the same direction as the turning direction of the vehicle.

As illustrated in FIG. 14, when the lateral deviation $Yv_0$ is zero or positive and the angle deviation $d\theta\alpha$ is larger than a threshold value that, a negative increase or decrease amount in the longitudinal acceleration, that is, an increase or decrease amount in the longitudinal acceleration by which the longitudinal acceleration generated in the vehicle is decreased is calculated (region A in FIG. 14) by the speed control. In addition, when the lateral deviation $Yv_0$ is zero or positive and the angle deviation $d\theta\alpha$ is larger than a threshold value tha2 (>tha1), an increase or decrease amount in the yaw moment is calculated so that the yaw moment generated in the vehicle is increased in the turning direction (region C of FIG. 14). In addition, when the lateral deviation $Yv_0$ is zero or negative and the angle deviation $d\theta\alpha$ is smaller than a threshold value tha1', a positive increase or decrease amount in the longitudinal acceleration, that is, an increase or decrease amount in the longitudinal acceleration by which the longitudinal acceleration generated in the vehicle is increased is calculated (region B in FIG. 14) by the speed control. In addition, when the lateral deviation $Yv_0$ is zero or negative and the angle deviation $d\theta\alpha$ is smaller than a threshold value tha2' (<tha1'), an increase or decrease amount in the yaw moment is calculated so that the yaw moment generated in the vehicle is increased in an opposite direction to the turning direction (region D of FIG. 14). Here, a method of calculating the increase or decrease amount in the longitudinal acceleration and a method of calculating the increase or decrease amount in the yaw moment may be methods of calculating the increase or decrease amount in the longitudinal acceleration and the increase or decrease amount in the yaw moment so that an absolute value of the angle deviation $d\theta\alpha$ is decreased.

In S204, a final longitudinal acceleration command value and a final yaw moment command value are calculated from the increase or decrease amount in the longitudinal acceleration, the increase or decrease amount in the yaw moment, driver's inputs (a steering angle manipulation amount, an accelerator pedal manipulation amount, and a brake pedal manipulation amount), and vehicular motion states (a longitudinal acceleration, a lateral acceleration, a yaw rate, and a vehicle speed). In detail, the longitudinal acceleration command value is calculated by adding the increase or decrease amount in the longitudinal acceleration to a longitudinal acceleration generated in the vehicle by an accelerator pedal manipulation, or the like, of a driver, and the yaw moment command value is calculated by adding the increase or decrease amount in the yaw moment to a yaw moment generated in the vehicle by a steering manipulation, or the like, of the driver.

Returning to FIG. 9, in S300, control command values of respective actuators are calculated and transmitted on the basis of the longitudinal acceleration command value and the yaw moment command value as the target control amount. For example, when the longitudinal acceleration is controlled using the combustion engine and the yaw moment is controlled using the electric power steering, a braking or driving torque command value for generating the longitudinal acceleration in the vehicle is transmitted to a controller of the combustion engine, and a steering angle command value for generating the yaw moment in the vehicle is transmitted to the controller of the electric power steering.

As described above, in the first embodiment, acceleration or deceleration is performed on the vehicle that is turning depending on the deviation from the target trajectory, such that the deviation can be decreased while suppressing the change in the steering angle, and when the deviation can not be sufficiently decreased by the acceleration or the deceleration, the deviation is decreased by the yaw moment control, such that an application scene can be expanded as compared with a case in which the control is performed by only the acceleration or the deceleration.

Second Embodiment

Next, components and operations of a vehicular motion control device according to a second embodiment of the invention are described with reference to FIGS. 15 to 19. It should be noted that the same components as those of the first embodiment are denoted by the same reference numerals and a detailed description therefor is omitted.

First, components of a vehicle mounted with the vehicular motion control device according to the second embodiment of the invention and the vehicular motion control device are described with reference to FIGS. 15 and 16.

Figure 15:
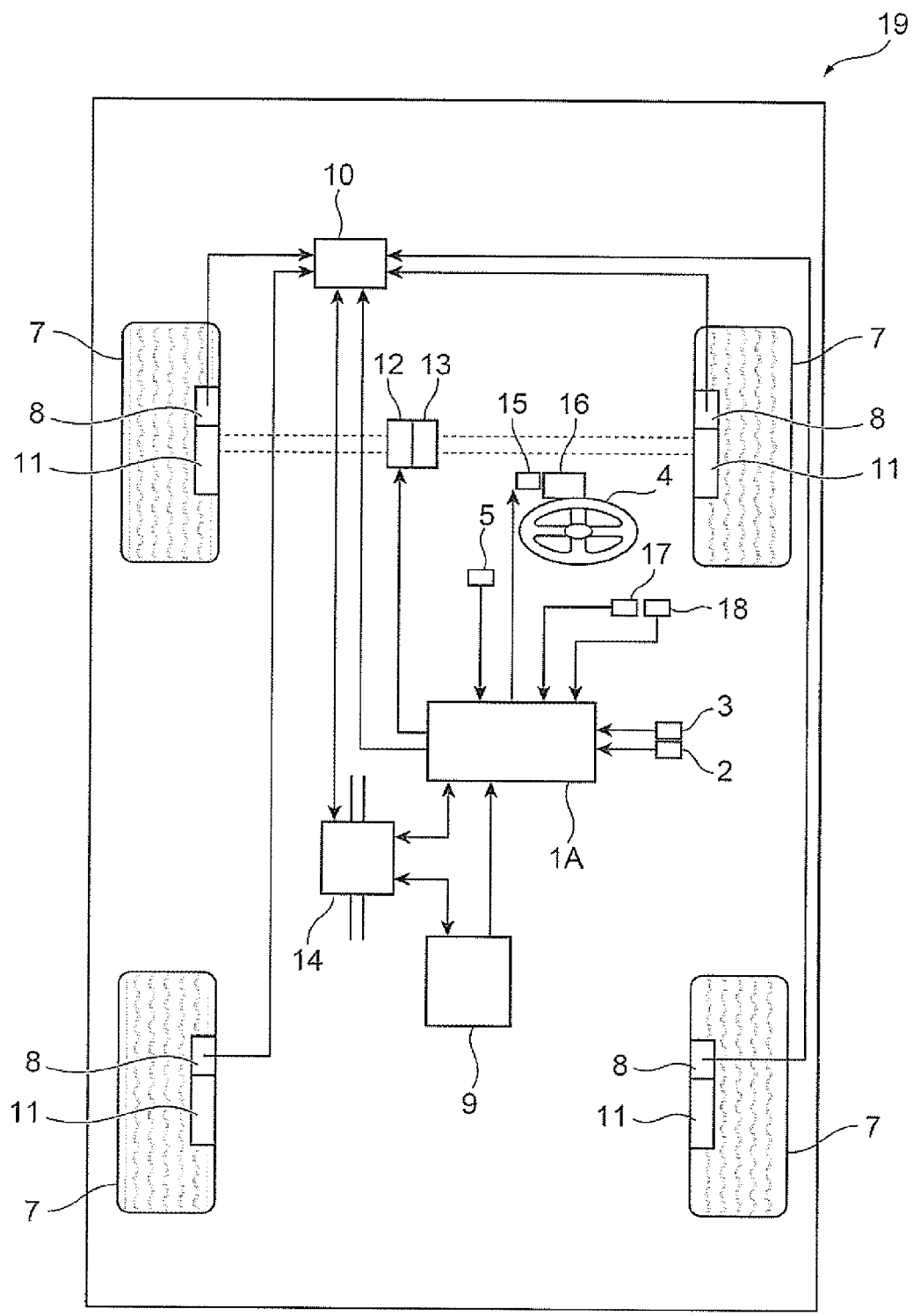
FIG. 15 is a conceptual diagram illustrating internal components of a vehicle mounted with a vehicular motion control device according to a second embodiment of the invention.

FIG. 15 illustrates a configuration diagram of the vehicle mounted with the vehicular motion control device according to the second embodiment of the invention. It should be noted that in the vehicular motion control device 1A according to the second embodiment, the course shape acquisition sensor 6 of the vehicular motion control device 1 according to the first embodiment is omitted.

The vehicular motion control device 1A according to the second embodiment is mounted in a vehicle 19, performs calculation required for a speed control on the basis of information acquired from sensors (an acceleration sensor 2, a gyro sensor 3, and wheel speed sensors 8) acquiring vehicular motion state information and sensors (a steering angle sensor 5, a brake pedal sensor 17, and an accelerator pedal sensor 18) acquiring driver manipulation information, and transmits drive signals to the respective control units (a brake control unit 10 and a drive torque control unit 12) performing a drive control on actuators (brake actuators 11 and a drive actuator 13) capable of controlling a longitudinal acceleration generated in the vehicle through a communication line 14 on the basis of a calculation result.

The vehicular motion control device 1A includes a calculation device having a storage area, a calculation processing capability, and signal input and output means, calculates a longitudinal acceleration command value to be generated in the vehicle 19 from information obtained by the vehicular motion state information and the driver manipulation information, and transmits the longitudinal acceleration command value to a drive controller of the acceleration or deceleration actuator using the acceleration or deceleration actuator capable of generating a longitudinal acceleration that becomes the longitudinal acceleration command value as a longitudinal acceleration generating means.

Here, the transmitted signal is not the longitudinal acceleration itself, but may be a signal that can implement the longitudinal acceleration command value by the acceleration or deceleration actuator.

In addition, as the communication line 14, different communication lines and communication protocols may be used depending on signals. For example, Ethernet (registered trademark) may be used for communication with actuators that need to exchange massive data, and a controller area network (CAN) may be used for communication with the other actuators.

Figure 16:
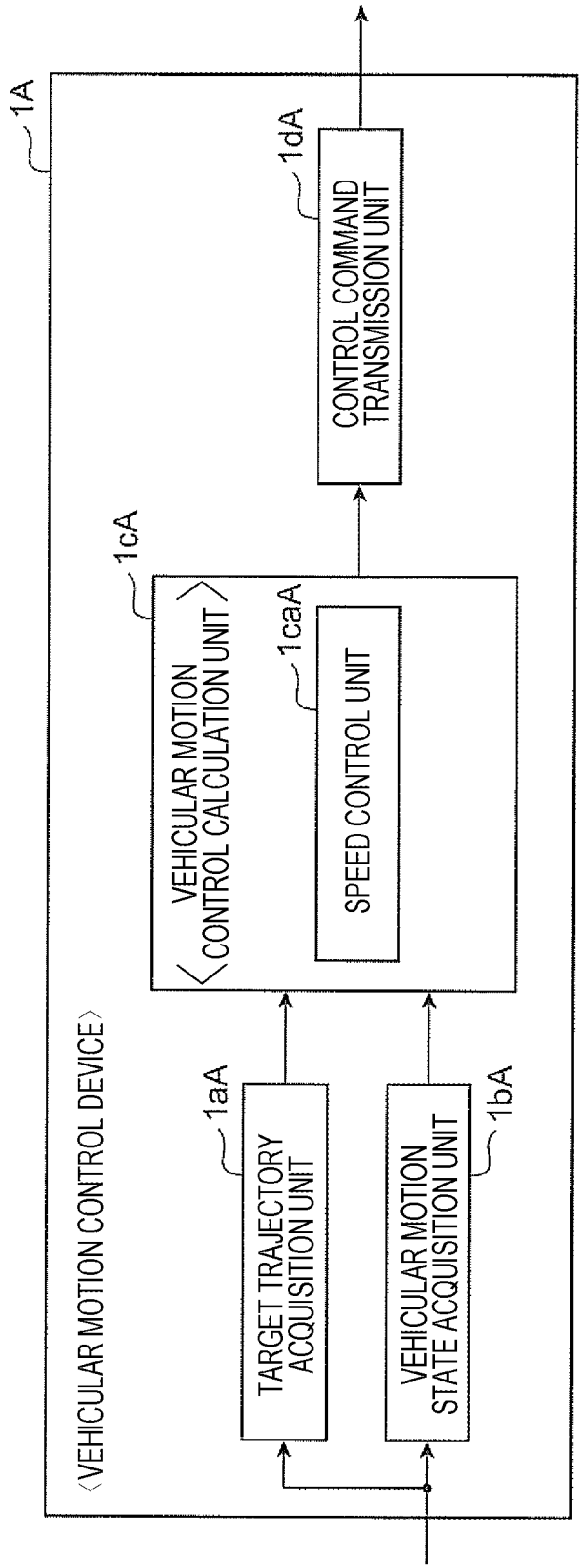
FIG. 16 is a block diagram illustrating internal components of the vehicular motion control device according to the second embodiment of the invention.

FIG. 16 illustrates a block diagram of the vehicular motion control device 1A according to the second embodiment of the invention.

As illustrated, the vehicular motion control device 1A basically consists of a target trajectory acquisition unit 1aA, a vehicular motion state acquisition unit 1bA, a vehicular motion control calculation unit 1cA, and a control command transmission unit 1dA as in the vehicular motion control device 1 according to the first embodiment, and the target trajectory acquisition unit 1aA acquires a target trajectory from vehicular motion states and a driver manipulation amount. Here, as a method of creating the target trajectory, the target trajectory is created using a vehicle model of the vehicle 19 that uses a steering angle and a vehicle speed as inputs.

The vehicular motion state acquisition unit 1bA acquires the vehicular motion states (a travel speed, a turning state, and a drive manipulation amount) from the vehicular motion state information.

(A speed control unit 1caA of) The vehicular motion control calculation unit 1cA calculates a longitudinal acceleration command value by the speed control on the basis of information obtained by the target trajectory acquisition unit 1aA and the vehicular motion state acquisition unit 1bA, and transmits a calculation result to the control command transmission unit 1dA.

The control command transmission unit 1dA transmits drive command values to the respective control units (the brake control unit 10 and the drive torque control unit 12) performing the drive control on the actuators (the brake actuators 11 and the drive actuator 13) capable of controlling the longitudinal acceleration on the basis of the longitudinal acceleration command value created by the vehicular motion control calculation unit 1cA.

Figure 17:
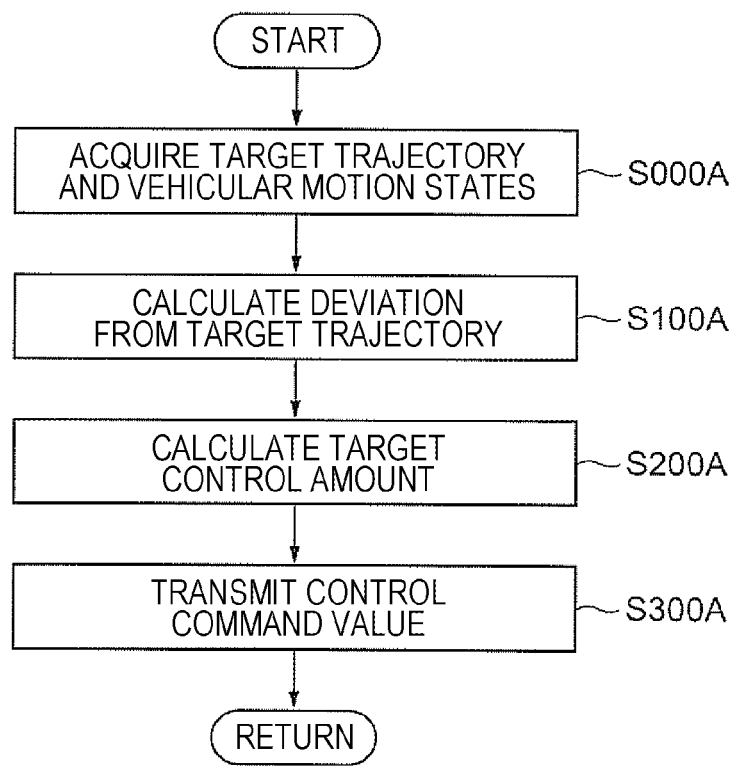
FIG. 17 is a calculation flowchart of the vehicular motion control device according to the second embodiment of the invention.

FIG. 17 illustrates a calculation flowchart in the vehicular motion control device 1A according to the second embodiment.

First, in S000A, as described above, the target trajectory and the vehicular motion states are acquired. Here, the target trajectory is set to a trajectory calculated using a vehicle model from the steering angle and the vehicle speed. For example, when a lateral acceleration Gyest generated in the vehicle by steering is calculated by the vehicle model, a curvature of a vehicle traveling trajectory is estimated from the lateral acceleration Gyest and the vehicle speed V, and the estimated curvature is set to a target trajectory curvature ktgt.

Then, in S100A, a deviation from the target trajectory is calculated from the target trajectory and the vehicular motion states acquired in S000. In this embodiment, a curvature deviation dκ is calculated from the target trajectory curvature ktgt and the vehicle traveling curvature kact illustrated in FIG. 2 described above, and the calculated curvature deviation is set to the deviation from the target trajectory. Here, in a vehicle turning in the same direction (rightward direction or leftward direction) as the target trajectory curvature, a curvature deviation dκ when the target trajectory curvature ktgt at a traveling position or in the vicinity of the front of the vehicle is larger than the vehicle traveling curvature kact is set to be negative.

After the calculation, the curvature deviation dκ is transmitted.

In S200A, a target control amount is calculated using the curvature deviation dκ and the vehicular motion state information. In this embodiment, a case in which the speed control illustrated in FIG. 2 described above is performed is described.

Figure 18:
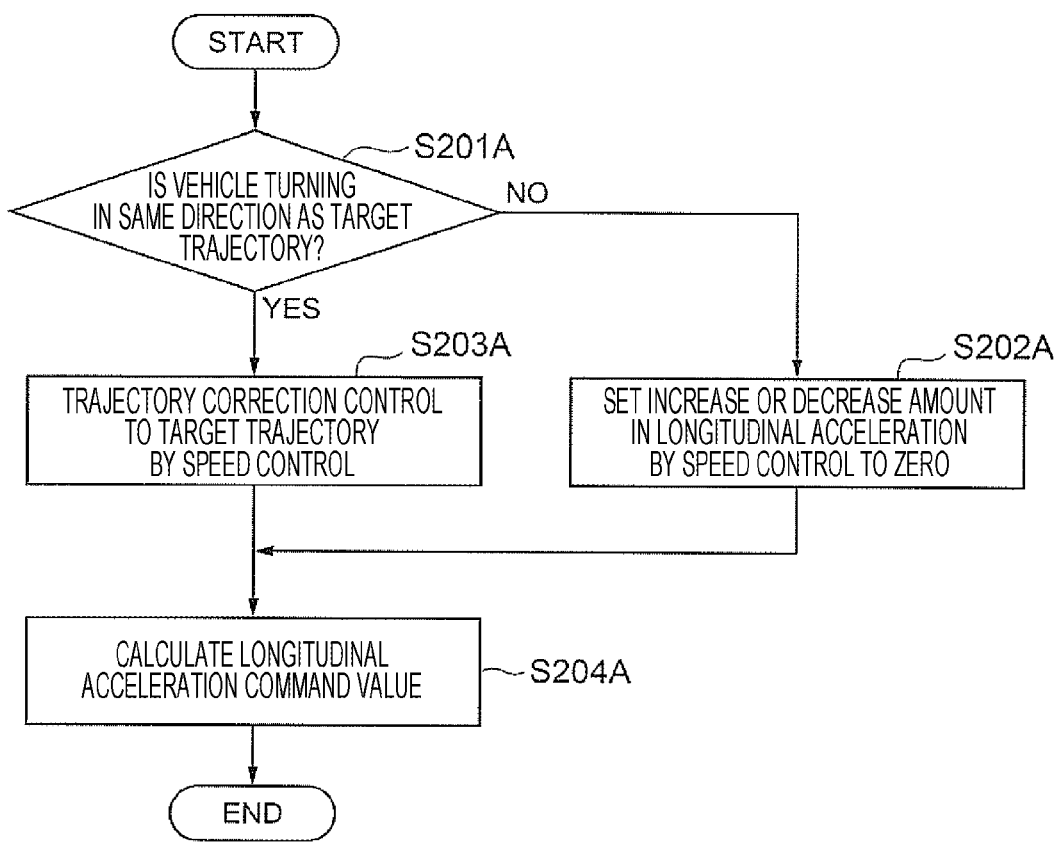
FIG. 18 is a calculation flowchart of target control amount calculation of the vehicular motion control device according to the second embodiment of the invention.

FIG. 18 illustrates a calculation flowchart in S200A described above.

In S201A, it is determined whether or not the vehicle is turning in the same direction as the target trajectory. As a determination method, if the vehicle speed is a positive value, the lateral acceleration Gyest and a lateral acceleration generated in the vehicle have the same direction, an absolute value of the lateral acceleration is equal to or larger than any threshold value, and the lateral acceleration Gyest and the lateral acceleration have the same sign for a predetermined time or more, it is determined that the vehicle is turning in the same direction as the target trajectory. In this way, even under a condition in which the lateral acceleration is generated, it is determined whether the vehicle performs a temporary turning motion such as a lane change or performs a turning motion depending on traveling on a turning road. When it is determined that the vehicle is turning in the same direction as the target trajectory, a process proceeds to S203A. Otherwise, a process proceeds to S202A.

In S202A, a traveling state of the vehicle is not a target of a traveling trajectory correction control by the speed control, such that an increase or decrease amount in the longitudinal acceleration is set to zero and the target control amount is calculated.

On the other hand, in S203A, a trajectory correction control by the speed control to the target trajectory in a case in which the vehicle is turning in the same direction as the target trajectory is performed.

Figure 19:
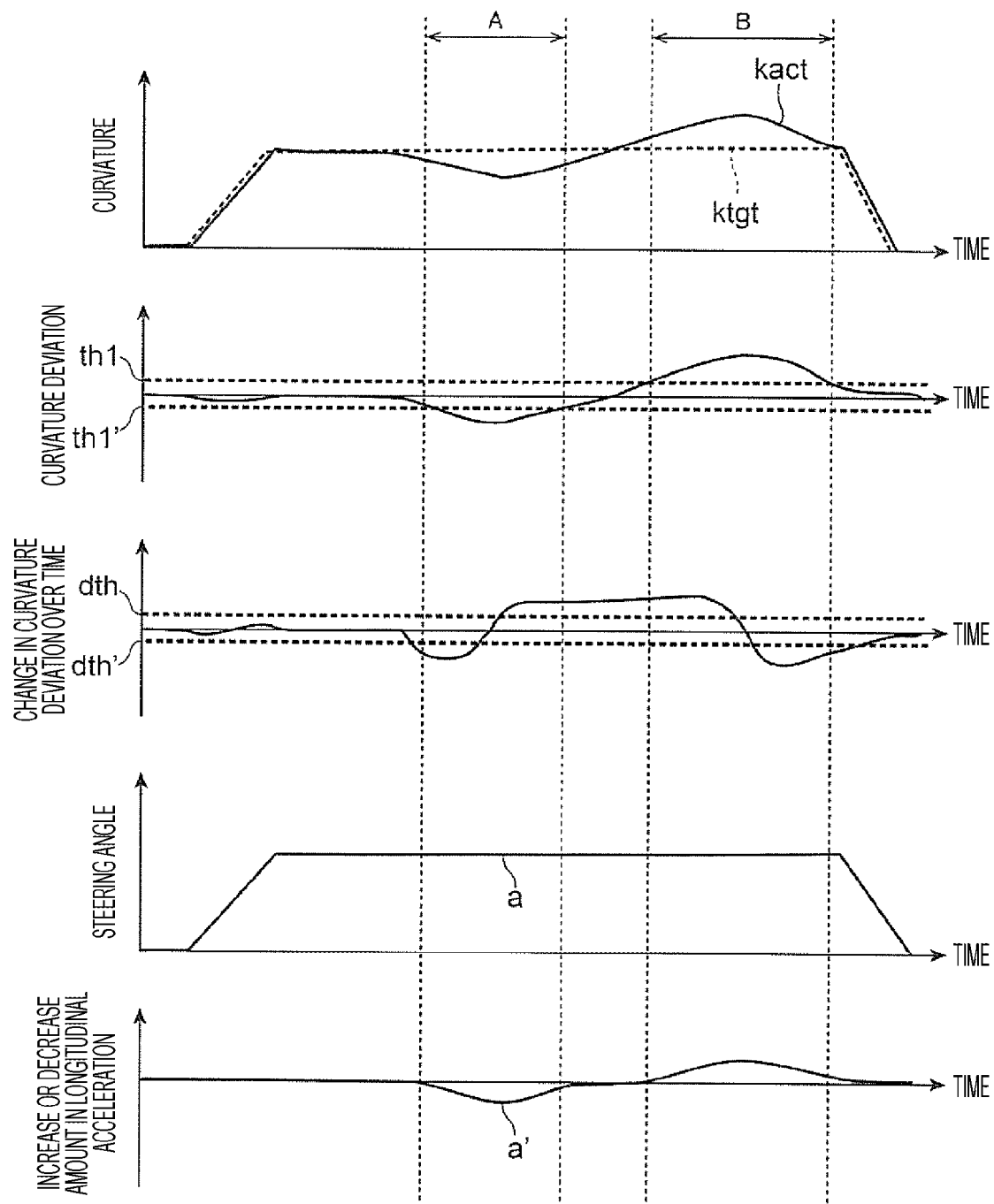
FIG. 19 is a conceptual diagram illustrating calculation results of a steering angle and an increase or decrease amount in a longitudinal acceleration in time series in the vehicular motion control device according to the second embodiment of the invention.

FIG. 19 illustrates an increase or decrease amount in a longitudinal acceleration and by a speed control based on the curvature deviation dκ.

As illustrated in FIG. 19, when the curvature deviation dκ is smaller than a threshold value th1', a negative increase or decrease amount in the longitudinal acceleration, that is, an increase or decrease amount in the longitudinal acceleration by which the longitudinal acceleration generated in the vehicle is decreased is calculated (region A in FIG. 19) by the speed control. In addition, when the curvature deviation dκ is larger than a threshold value th1, a positive increase or decrease amount in the longitudinal acceleration, that is, an increase or decrease amount in the longitudinal acceleration by which the longitudinal acceleration generated in the vehicle is increased is calculated (region B in FIG. 19) by the speed control. Here, a method of calculating the increase or decrease amount in the longitudinal acceleration may be a method of calculating the increase or decrease amount in the longitudinal acceleration so that an absolute value of the curvature deviation dκ is decreased.

In S204A, a final longitudinal acceleration command value is calculated from the increase or decrease amount in the longitudinal acceleration, driver's inputs (a steering angle manipulation amount, an accelerator pedal manipulation amount, and a brake pedal manipulation amount), and vehicular motion states (a longitudinal acceleration, a lateral acceleration, a yaw rate, and a vehicle speed). In detail, the longitudinal acceleration command value is calculated by adding the increase or decrease amount in the longitudinal acceleration to a longitudinal acceleration generated in the vehicle by an accelerator pedal manipulation, or the like, of a driver.

Returning to FIG. 17, in S300A, control command values of the respective actuators are calculated and transmitted on the basis of the longitudinal acceleration command value as the target control amount. For example, when the longitudinal acceleration is controlled using a combustion engine, a braking or driving torque command value for generating the longitudinal acceleration in the vehicle is transmitted to a controller of the combustion engine.

As described above, in the second embodiment, acceleration or deceleration is performed on the vehicle that is turning depending on the deviation from the target trajectory without requiring sensors acquiring a vehicle traveling route, such as a course shape acquisition sensor 6 and an own vehicle position detection sensor 9, such that the deviation can be decreased while suppressing a change in the steering angle. In this way, a correction steering amount by the driver can be decreased without using special sensors and actuators. In addition, excessive correction steering is decreased, such that traveling stability of the vehicle that is turning can be improved.

In addition, in the first and second embodiments described above, the vehicle in which a manipulation input by the driver exists is described, but the invention can also be applied to a vehicle mounted with an automatic driving system in which a controller controls a vehicular motion instead of the driver, and the stability of the turning described above can be improved.

It should be noted that the invention is not limited to the abovementioned embodiments, but variously modified. For example, the abovementioned embodiments have been described in detail in order to easily explain the invention, and are not necessarily limited to including all the components described above. In addition, some of the components of any embodiment can be replaced with components of another embodiment, and components of another embodiment can be added to components of any embodiment. In addition, it is possible to add, delete, and replace other components with respect to some of the components of the respective embodiments.

In addition, the abovementioned components, functions, processing units, processing means, and the like, may be implemented by hardware by designing some or all of them with, for example, integrated circuits. In addition, the abovementioned respective component, functions, and the like, may be implemented by software by processors interpreting and executing a program implementing the respective functions. Information such as programs, tables, files, and the like, implementing the respective functions can be stored in a storage device such as a memory, a hard disk, a solid state drive (SSD), etc., or a recording medium such as an integrated circuit (IC) card, a secure digital (SD) card, a digital versatile disk (DVD), etc.

In addition, only control lines or information lines considered to be required for explanation are illustrated, and all control lines or information lines of products are not necessarily illustrated. Actually, it may be considered that almost all components are connected to each other.

REFERENCE SIGNS LIST

1 Vehicular motion control device
1a Target trajectory acquisition unit
1b Vehicular motion state acquisition unit
1c Vehicular motion control calculation unit
1ca Speed control unit
1cb Yaw moment control unit
1d Control command transmission unit
2 Acceleration sensor
3 Gyro sensor
4 Steering wheel
5 Steering angle sensor
6 Course shape acquisition sensor
7 Tire
8 Wheel speed sensor
9 Own vehicle position detection sensor
10 Brake control unit
11 Brake actuator
12 Drive torque control unit
13 Drive actuator
14 Communication line
15 Steering angle control unit 16 Steering angle control actuator
17 Brake pedal sensor
18 Accelerator pedal sensor
19 Vehicle

The invention claimed is:

1. A vehicular motion control device comprising:
a memory;
a plurality of sensors that acquire a target trajectory for a vehicle to travel and a travel trajectory of the vehicle; and
a processor communicably coupled to the memory and the plurality of sensors, wherein the processor is configured to:
  determine whether the vehicle is turning in a same direction as the target trajectory,
  on a condition that the vehicle is turning in the same direction as the target trajectory, perform a target correction control by controlling a speed of the vehicle,
  on a condition that the vehicle is turning in a direction different from the direction of the target trajectory, the target correction control by controlling the speed of the vehicle is not performed,
  calculate a curvature deviation by subtracting a target trajectory curvature from a travel trajectory curvature,
  on a condition that the curvature deviation is less than a first threshold, the processor calculates a decrease for a change in a longitudinal acceleration of the vehicle,
  on a condition that the curvature deviation is equal to or greater than a second threshold, the processor calculates an increase for the change in the longitudinal acceleration of the vehicle,
  calculate final longitudinal acceleration control information based on the change in the longitudinal acceleration and driver inputs,
  send, to at least one actuator, the final longitudinal acceleration control information to change the longitudinal acceleration of the vehicle, and
  control, by the at least one actuator, an increase in the longitudinal acceleration or a decrease in the longitudinal acceleration based on the final longitudinal acceleration control information.

2. The vehicular motion control device according to claim 1, wherein when detecting, via the plurality of sensors, that the vehicle deviates from the target trajectory during the turning of the vehicle and decreasing a radius of a turn of the vehicle, the processor sends the final longitudinal acceleration control information to increase the longitudinal acceleration of the vehicle.

3. The vehicular motion control device according to claim 1, wherein when detecting, via the plurality of sensors, that the vehicle deviates from the target trajectory during the turning of the vehicle and increasing a radius of a turn of the vehicle, the processor sends the longitudinal acceleration control information to decrease the longitudinal acceleration of the vehicle.

4. The vehicular motion control device according to claim 1,
wherein the at least one actuator controls a yaw moment of the vehicle,
wherein when a lateral deviation of the vehicle is larger than a third threshold value, the processor sends a signal to the at least one actuator and the at least one actuator changes the yaw moment.

5. The vehicular motion control device according to claim 4, wherein the at least one actuator includes at least one of a steering angle actuator controlling an actual tire steering angle and a direct yaw moment actuator controlling a yaw moment generated in the vehicle by a difference between a braking force or a driving force generated in a right tire of a vehicle traveling direction and a braking force or a driving force generated in a left tire of the vehicle traveling direction.

6. The vehicular motion control device according to claim 5, wherein when detecting, via the plurality of sensors, that the vehicle deviates from the target trajectory during the turning of the vehicle and decreasing a radius of a turn of the vehicle, the processor sends the final longitudinal acceleration control information to decrease the longitudinal acceleration of the vehicle, and
when detecting, via the plurality of the sensors, that the vehicle deviates from the target trajectory during the turning of the vehicle and increasing the radius of the turn of the vehicle, the at least one actuator alters the yaw moment so that the actual tire steering angle is increased.

7. The vehicular motion control device according to claim 1, wherein the target trajectory is created on the basis of at least one of traveling trajectories calculated on the basis of a geometric shape of a route on which the vehicle travels, a past traveling trajectory of the route on which the vehicle travels, a steering angle of the vehicle, and a vehicle speed.

8. The vehicular motion control device according to claim 1, wherein at least one actuator controls the change in the longitudinal acceleration depending on at least one of the curvature deviation and a change in the curvature deviation over time.

9. The vehicular motion control device according to claim 1, wherein the at least one actuator controls the longitudinal acceleration depending on at least one of a driving manner of the vehicle and response characteristic of a yaw rate of the vehicle.

10. The vehicular motion control device according to claim 1, wherein the at least one actuator controls the longitudinal acceleration depending on a distance between the target trajectory and the vehicle.

11. The vehicular motion control device according to claim 1, wherein the at least one actuator alters the longitudinal acceleration only when the target trajectory and a turning direction of the vehicle are the same as each other.

12. A vehicular motion control method including:
acquiring, via a plurality of sensors, target trajectory of a vehicle and at least one vehicular motion state;
determine, via a processor, whether the vehicle is turning in a same direction as the target trajectory;
  on a condition that the vehicle is turning in the same direction as the target trajectory, perform a target correction control by controlling a speed of the vehicle,
  on a condition that the vehicle is turning in a direction different from the direction of the target trajectory, the target correction control by controlling the speed of the vehicle is not performed,
calculate, via the processor, a curvature deviation by subtracting a target trajectory curvature from a travel trajectory curvature;
  on a condition that the curvature deviation is less than a first threshold, the processor calculates a decrease for a change in a longitudinal acceleration of the vehicle,
  on a condition that the curvature deviation is equal to or greater than a second threshold, the processor calculates an increase for the change in the longitudinal acceleration of the vehicle, calculate, via the processor, final longitudinal acceleration control information based on the change in the longitudinal acceleration and driver inputs;

send, via an input/output device, the final longitudinal acceleration control information to at least one actuator to change the longitudinal acceleration of the vehicle; and control, by the at least one actuator, an increase in the longitudinal acceleration or a decrease in the longitudinal acceleration based on the final longitudinal acceleration control information.

* * * * *